(12) United States Patent
Boshra et al.

(10) Patent No.: US 9,053,351 B2
(45) Date of Patent: *Jun. 9, 2015

(54) FINGER SENSING APPARATUS USING IMAGE WATERMARKING AND ASSOCIATED METHODS

(75) Inventors: Michael Boshra, Indialantic, FL (US); Jeffrey C. Lee, Melbourne, FL (US); Gregory Thomas Minteer, Indian Harbour Beach, FL (US); Gary S. Porter, Malabar, FL (US); Dale R. Setlak, Melbourne, FL (US); Peter E. Sherlock, Viera, FL (US); Andrew J. Vandamia, Rockledge, FL (US); James R. Waldron, Oviedo, FL (US)

(73) Assignee: APPLE INC., Cupertino, CA (US)

( * ) Notice: Subject to any disclaimer, the term of this patent is extended or adjusted under 35 U.S.C. 154(b) by 2362 days.

This patent is subject to a terminal disclaimer.

(21) Appl. No.: 11/851,842

(22) Filed: Sep. 7, 2007

(65) Prior Publication Data

US 2009/0067687 A1   Mar. 12, 2009

(51) Int. Cl.
  *G06F 21/32*   (2013.01)
  *G06K 9/00*   (2006.01)
  *G07C 9/00*   (2006.01)

(52) U.S. Cl.
  CPC .......... *G06K 9/00006* (2013.01); *G06F 21/32* (2013.01); *G06K 9/00577* (2013.01); *G07C 9/00158* (2013.01)

(58) Field of Classification Search
  USPC ......... 382/124, 100, 115, 116, 125, 209, 268; 713/176, 186
  See application file for complete search history.

(56) References Cited

U.S. PATENT DOCUMENTS

| 5,598,474 A | 1/1997 | Johnson ........................ 380/23 |
| 5,956,415 A | 9/1999 | McCalley et al. ............. 382/124 |

(Continued)

FOREIGN PATENT DOCUMENTS

| EP | 0863491 | 9/1998 |
| WO | WO0042577 | 7/2000 |
| WO | WO2006043185 | 4/2006 |

OTHER PUBLICATIONS

Blythe et al: "Secure Digital Camera" Internet Citation, [Online] XP002413047;  URL:http//www.ws.binghamton.deu/fridrich/Research/DFRWfinal.pdf>; retrieved on Jan. 3, 2007; section3.2 Lossless watermarking, Abstract; Figure 4.

(Continued)

*Primary Examiner* — Michael A Newman
(74) *Attorney, Agent, or Firm* — Allen, Dyer, Doppelt, Milbrath & Gilchrist, P.A.

(57) ABSTRACT

A finger sensing device may include an integrated circuit (IC) substrate, an array of finger sensing elements on the IC substrate, and image watermark circuitry on the IC substrate and cooperating with the array of finger sensing elements for generating finger image data with an image watermark embedded therein. The finger sensing apparatus may also include match circuitry on the IC substrate for performing finger matching based at least upon the image watermark. The array of finger sensing elements may include an array of finger sensing pixels. The image watermark circuitry may distort values from the array of finger sensing pixels to generate the finger image data with the image watermark embedded therein. The watermark circuitry may distort position values from the array of finger sensing pixels.

25 Claims, 17 Drawing Sheets

(56) References Cited

U.S. PATENT DOCUMENTS

| | | | | |
|---|---|---|---|---|
| 5,963,679 | A * | 10/1999 | Setlak | 382/312 |
| 6,011,859 | A * | 1/2000 | Kalnitsky et al. | 382/124 |
| 6,185,316 | B1 * | 2/2001 | Buffam | 382/115 |
| 6,208,746 | B1 * | 3/2001 | Musgrave | 382/100 |
| 6,301,368 | B1 | 10/2001 | Bolle et al. | 382/100 |
| 6,332,193 | B1 | 12/2001 | Glass et al. | 713/170 |
| 6,823,451 | B1 | 11/2004 | Gulick et al. | 713/153 |
| 6,836,554 | B1 | 12/2004 | Bolle et al. | 382/116 |
| 7,043,048 | B1 * | 5/2006 | Ellingson | 382/100 |
| 7,120,607 | B2 | 10/2006 | Bolle et al. | 705/64 |
| 7,127,106 | B1 | 10/2006 | Neil et al. | 382/181 |
| 7,457,966 | B2 * | 11/2008 | Shinada | 713/185 |
| 7,489,807 | B2 * | 2/2009 | Hwang et al. | 382/124 |
| 2001/0025342 | A1 * | 9/2001 | Uchida | 713/186 |
| 2003/0056122 | A1 | 3/2003 | Wuidart | 726/5 |
| 2003/0169910 | A1 * | 9/2003 | Reisman et al. | 382/124 |
| 2005/0063562 | A1 * | 3/2005 | Brunk et al. | 382/100 |
| 2005/0069171 | A1 * | 3/2005 | Rhoads et al. | 382/100 |
| 2005/0081040 | A1 | 4/2005 | Johnson et al. | 713/176 |
| 2005/0089203 | A1 | 4/2005 | Setlak | 382/124 |
| 2005/0129291 | A1 | 6/2005 | Boshra | 382/124 |
| 2006/0093191 | A1 | 5/2006 | Neil et al. | 382/124 |

OTHER PUBLICATIONS

Taehae Kim et al: "Secure Remote Fingerprint Verification Using Dual Watermarks", Digital Rights Management. Technologies, Issues, Challenges and System S Lecture Notes in Computer Science; LNCS, Springer, Berlin, DE, vol. 3913. Jan. 1, 2006, pp. 217-227, XP019036831, ISBN: 978-3-540-35998-2, Section 2.2 Vulnerabilities in Fingerprint Verification, Abstract, Figure 2.

* cited by examiner

FIG. 12 —SECURE SOFTWARE UPDATE PROCESS (EXECUTION PHASE)

FINGER SENSING APPARATUS USING IMAGE WATERMARKING AND ASSOCIATED METHODS

FIELD OF THE INVENTION

The present invention relates to biometric sensing, and, more particularly to finger sensing using integrated circuit finger sensors and associated methods.

BACKGROUND OF THE INVENTION

Fingerprint sensing and matching is a reliable and widely used technique for personal identification or verification. In particular, a common approach to fingerprint identification involves scanning a sample fingerprint or an image thereof and storing the image and/or unique characteristics of the fingerprint image. The characteristics of a sample fingerprint may be compared to information for reference fingerprints already in a database to determine proper identification of a person, such as for verification purposes.

A particularly advantageous approach to fingerprint sensing is disclosed in U.S. Pat. No. 5,953,679 to Setlak et al. and assigned to the assignee of the present invention. The fingerprint sensor is an integrated circuit sensor that drives the user's finger with an electric field signal and senses the electric field with an array of electric field sensing pixels on the integrated circuit substrate. Such sensors are used to control access for many different types of electronic devices such as computers, cell phones, personal digital assistants (PDA's), and the like. In particular, fingerprint sensors are used because they may have a small footprint, are relatively easy for a user to use, and they provide reasonable authentication capabilities.

U.S. Published Patent Application No. 2005/0089203 also to Setlak and assigned to the assignee of the present invention discloses an integrated circuit biometric sensor that may sense multiple biometrics of the user, and that is also adapted to either a static placement sensor or a slide finger sensor. A slide finger sensor includes a smaller sensing surface over which the user's finger is slid. The images collected during the sliding process may be collected for matching, such as for authentication, or may be used for navigation, for example.

U.S. Published Patent Application No. 2001/0025342 to Uchida is directed to a biometric identification method and system where the system has a biometric input device and a separately provided biometric verifier. The biometric data input device has a biometric data sensor and an encoder that encodes digital biometric data using secret information identifying the biometric data input device to transmit encoded data to the biometric verifier. The biometric verifier decodes the encoded data using the secret information to reproduce digital biometric data. The system and method include the use of digital watermarking and/or encryption of data that is then transmitted to the verifier for decryption and decoding.

Some conventional fingerprint security systems, simply return an index indicating which template matched a live sample. An application running on a host computer would then retrieve security material from its own storage based on this answer. A shortcoming with this approach is that it is possible for a hacker to replace the software and hardware stack with a simple Dynamic-link library (DLL), for example, that just always returns a valid index number regardless of what finger is presented. In fact, no finger need be present at all. Accordingly, even if the application and the software cross-authenticate, there is still a single, locatable, point of attack where malicious software can change the returned answer to anything desired.

UPEK, Inc. of Emeryville, Calif. offers a TouchStrip® Fingerprint Authentication Module (TCED) that is a complete biometric subsystem based on its TCS3 sensor and TCD42 digital identification engine. Everything is mounted on a compact PCB including a USB-ready flex cable connector to simplify integration and speed time to market. Unfortunately, this so-called two-chip finger sensing approach may be relatively expensive compared to other approaches.

There are approaches to finger sensing that may have security issue that may be exploited. In addition, some existing finger sensing approaches, such as those requiring two dedicated chips, may be relatively expensive to implement.

SUMMARY OF THE INVENTION

In view of the foregoing background, it is therefore an object of the present invention to provide a finger sensing apparatus that has increased security and associated methods.

This and other objects, features and advantages in accordance with the present invention are provided by a finger sensing apparatus comprising an integrated circuit (IC) substrate, an array of finger sensing elements on the IC substrate, and image watermark circuitry on the IC substrate and cooperating with the array of finger sensing elements for generating finger image data with an image watermark embedded therein. The finger sensing apparatus may also include match circuitry on the IC substrate for performing finger matching based at least upon the image watermark. Accordingly, security for the finger sensing apparatus is enhanced.

The array of finger sensing elements may comprise an array of finger sensing pixels. The image watermark circuitry may distort values from the array of finger sensing pixels to generate the finger image data with the image watermark embedded therein. More particularly, the watermark circuitry may distort position values from the array of finger sensing pixels.

The image watermark circuitry may further comprise image watermark key generation circuitry for generating an image watermark key to generate the finger image data with the image watermark embedded therein. For example, the image watermark circuitry may further comprise a key cache for storing the image watermark key therein. Moreover, in some advantageous embodiments, the key cache does not release the image watermark key from the IC substrate. The key generation circuitry may further comprise a random number generator (RNG), and an associated hash engine cooperating therewith for generating the image watermark key. Accordingly, security is further enhanced.

In accordance with another advantage, the finger sensing apparatus may further comprise credential release circuitry on the IC substrate cooperating with the match circuitry for releasing at least one user credential based upon finger matching. This may thereby enable another device to perform at least one protected operation. The image watermark circuitry may generate the finger image data with an image watermark embedded therein during a matching, for example, and not during an enroll.

The sensing apparatus may further comprise a host platform external from the IC substrate and performing at least one prematch function. The at least one prematch function may comprise generating at least one match score for use by the match circuitry, for example. The apparatus may further comprise a common housing carrying the IC substrate and the host platform. In other words, the finger sensing apparatus may be in the form of an electronic device, such as a laptop, PDA, cellphone, etc.

A method aspect is for finger sensing. The method may include generating finger image data with an image watermark embedded therein using image watermark circuitry on an IC substrate cooperating with an array of finger sensing elements also on the IC substrate, and performing finger matching based at least upon the image watermark using match circuitry on the IC substrate.

DETAILED DESCRIPTION OF THE PREFERRED EMBODIMENTS

The present invention will now be described more fully hereinafter with reference to the accompanying drawings in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
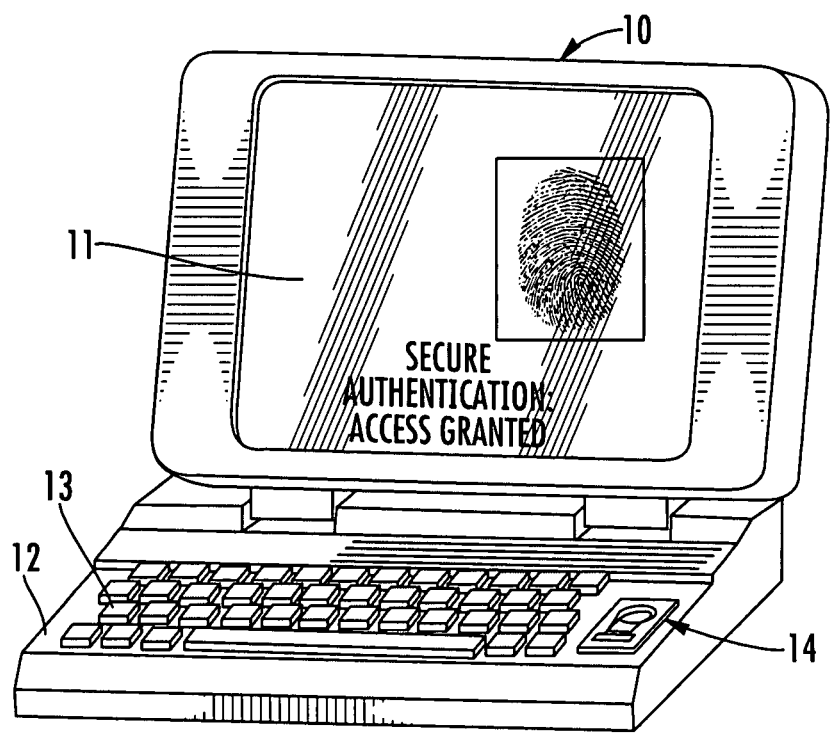
FIG. 1 is a perspective view of an electronic device in the form of a laptop computer including a finger sensor and enhanced security in accordance with the present invention.

Referring now to FIG. 1, a computer 10 with enhanced security features according to one or more aspects of the invention is first described. The computer 10 is illustratively shown to be a laptop computer, but the present invention is applicable to other computers (e.g. desktop computers) as well. Furthermore, the features of the present invention are applicable to other electronic devices such as wireless communication devices, Personal Digital Assistant (PDA) devices, or any other electronic device that may benefit from biometric access control.

The computer 10 includes a display 11 connected to a base 12 or housing. A keyboard 13 and a biometric security sensor 14 may be included on a top side of the base 12, for example. Of course, the biometric security sensor 13 may be mounted at other suitable locations on the computer 10. The biometric security sensor 13 may be a finger sensor.

A. First Embodiment

Figure 2:
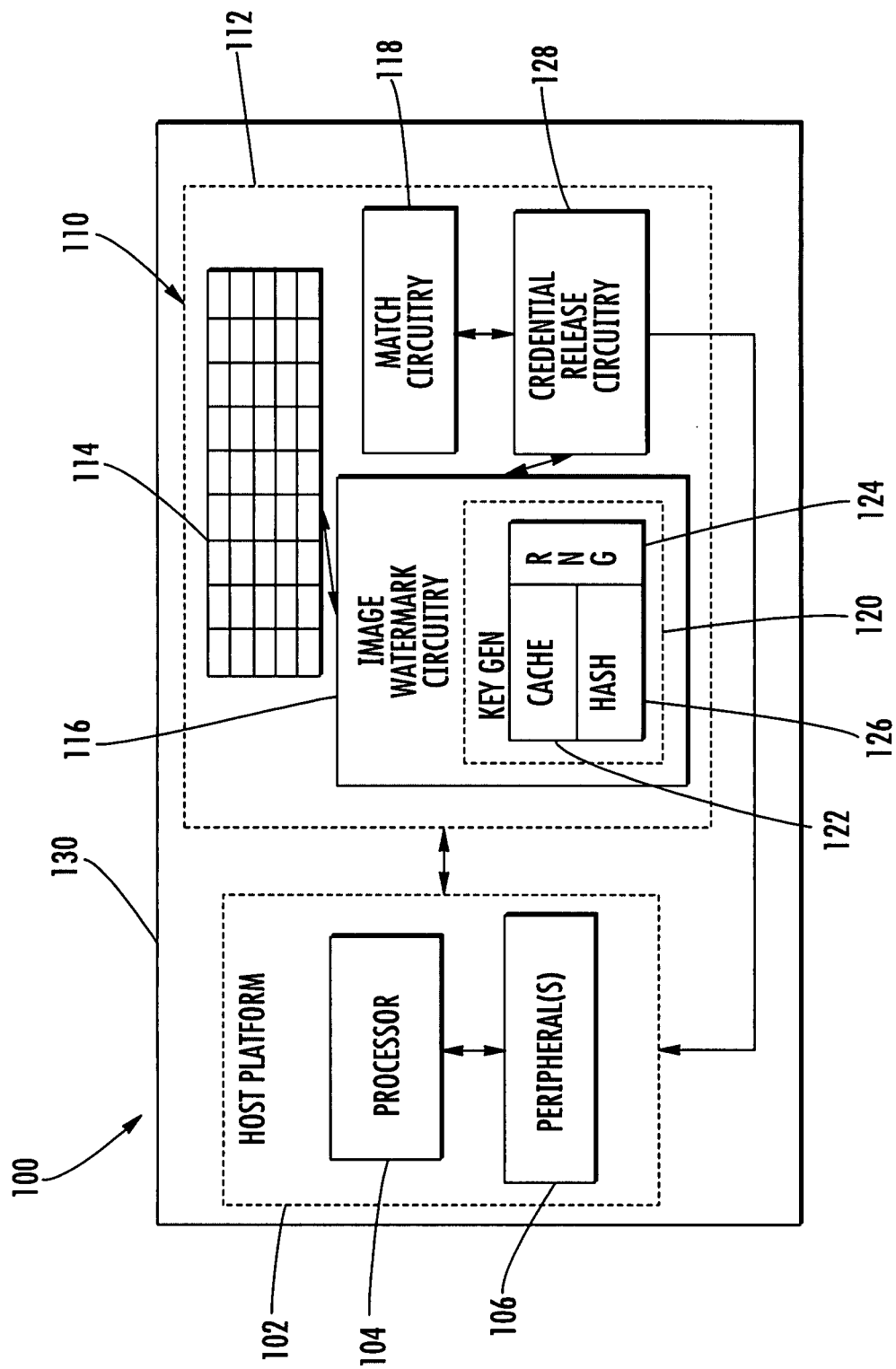
FIG. 2 is schematic block diagram of a first embodiment of a finger sensing apparatus using image watermarking in accordance with the present invention.

Referring now additionally to FIG. 2, further details of a first embodiment of a secure electronic device 100, such as the computer 10 of FIG. 1, will be described. The computer 10 illustratively includes a host platform 102 having a processor 104 and other associated peripherals 106 such as memories, disk drives etc. as would be appreciated by those skilled in the art. For example, a suitable memory may have basic input/output system (BIOS) instructions stored therein, and/or a magnetic disk (e.g., a hard disk) may have operating system (OS) instructions stored therein. The operating system may be Windows, for example, although the present invention may be used with other operating systems as well.

The finger sensing apparatus 110 includes an integrated circuit (IC) substrate 112, an array of finger sensing elements 114 on the (IC) substrate, and image watermark circuitry 116 on the IC substrate and cooperating with the array of finger sensing elements for generating finger image data with an image watermark embedded therein. The finger image data may include data based upon ridges, valleys, pores and/or capillaries, at the surface or within the skin, for example. The finger sensing apparatus 110 also illustratively includes match circuitry 118 on the IC substrate 112 for performing finger matching based at least upon the image watermark. Finger matching is further disclosed in U.S. Published Patent Application No. 2005/0129291 to Boshra, and assigned to the assignee of the present invention.

The array of finger sensing elements 114 may comprise an array of finger sensing pixels. The image watermark circuitry 116 may distort values from the array of finger sensing pixels 114 to generate the finger image data with the image watermark embedded therein. More particularly, the watermark circuitry 116 may distort position values from the array of finger sensing pixels 114.

The image watermark circuitry 116 further illustratively comprises image watermark key generation circuitry 120 for generating an image watermark key to generate the finger image data with the image watermark embedded therein. For example, the image watermark circuitry 120 may further comprise a key cache 122 for storing the image watermark key therein. Moreover, in some advantageous variations, the key cache 122 does not release the image watermark key from the IC substrate. The key generation circuitry 120 further comprises a random number generator (RNG) 124, and an associated hash engine 126 cooperating therewith for generating the image watermark key. Accordingly, security is further enhanced.

In accordance with another advantage, the finger sensing apparatus 110 may further comprise credential release circuitry 128 on the IC substrate 112 cooperating with the match circuitry 118 for releasing at least one user credential based upon finger matching. This may thereby enable another device, such as the host platform 102 to perform at least one protected operation. The image watermark circuitry 116 may generate the finger image data with an image watermark embedded therein during a matching, for example, and not during an enroll.

The sensing apparatus 110 also illustratively includes a host platform 102 external from the IC substrate 112 and performing at least one prematch function. The at least one prematch function may comprise generating at least one match score for use by the match circuitry 118, for example. The apparatus 110 may further comprise a common housing 130 carrying the IC substrate 112 and the host platform 102. In other words, the finger sensing apparatus 110 may be in the form of an electronic device, such as a laptop, PDA, cellphone, etc. For example, the common housing 130 may be the hard external case of a laptop computer or it may be a separate pod that is connected to the laptop.

A method aspect related to this first embodiment is for finger sensing. The method may include generating finger image data with an image watermark embedded therein using image watermark circuitry 116 on an IC substrate 112 cooperating with an array of finger sensing elements 114 also on the IC substrate, and performing finger matching based at least upon the image watermark using match circuitry 118 on the IC substrate.

The watermark may be verified through correlation with at least one match score using watermark verification techniques (e.g., reference to C. Rey and J. Dugelay, A Survey of Watermarking Algorithms for Image Authentication, EURASIP Journal on Applied Signal Processing, pp. 613-621, 2002).

B. Second Embodiment

Figure 3:
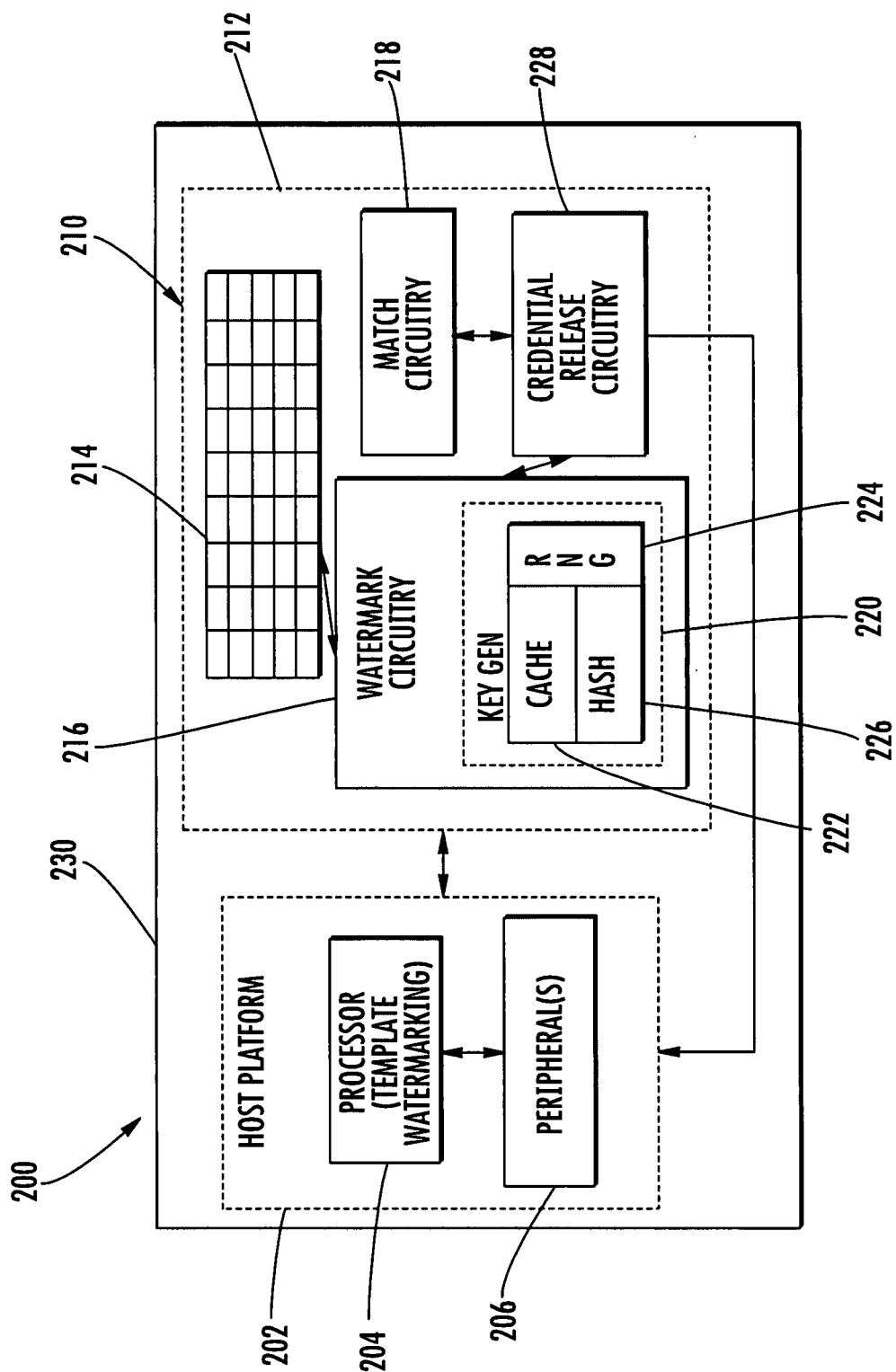
FIG. 3 is schematic block diagram of a second embodiment of a finger sensing apparatus using template watermarking in accordance with the present invention.

Referring now additionally to FIG. 3, further details of another embodiment of a secure electronic device 200, such as the computer 10 of FIG. 1, will be described. The device 200 illustratively includes a host platform 202 having a processor 204 and other associated peripherals 206.

The finger sensing apparatus 210 includes an integrated circuit (IC) substrate 212, an array of finger sensing elements 214 on the IC substrate, match circuitry 218 on the IC substrate, and the host platform 202 external from the IC substrate and cooperating with the array of finger sensing elements for generating finger template data with a template watermark embedded therein. In addition, the host platform 202 may also generate a match score based on the finger template data with the template watermark embedded therein for use by the match circuitry 212. Accordingly, the security of the finger sensing apparatus is enhanced, and a relatively low cost sensor 210 can be provided for use with a host platform 202, such as the processor and related circuitry found in a laptop, PDA, cellphone, etc.

The host platform 202 may generate the finger template data as mathematical values representative of distinguishing finger features. Accordingly, the host platform 202 may distort the mathematical values to generate the finger template data with the template watermark embedded therein. The host platform may generate the template data as finger ridge flow data and distort the finger ridge flow data to generate the finger template data with the template watermark embedded therein.

The finger sensing apparatus 210 may further include watermark circuitry 216 having key generation circuitry 220 on the IC substrate 212 for generating a template watermark key for use by the host platform 202 to generate the finger template data with the template watermark embedded therein. The finger sensing apparatus 210 may also include a template key cache 222 on the IC substrate 212 for storing the template watermark key therein. The template key generation circuitry 222 may further comprise a random number generator (RNG) 224, and an associated hash engine 226 cooperating therewith for generating the template watermark key.

The finger sensing apparatus 210 may further include credential release circuitry 228 on the IC substrate 212 cooperating with the match circuitry 218 for releasing at least one user credential based upon finger matching thereby enabling the host platform 202 to perform at least one protected operation. In addition, the host platform 202 may generate the finger template data with a template watermark embedded therein during an enrollment, and not during matching, for example. Of course, in several advantageous variations, a common housing 230 may carry the IC substrate 212 and the host platform 202, that is, the finger sensing apparatus 210 may be included in or be in the form of an electronic device, such as a laptop, PDA, cellphone, etc.

A related method for this second embodiment is for finger sensing. The method may include generating finger template data with a template watermark embedded therein and generating a match score based on the finger template data with the template watermark embedded therein using a host platform 202 external from an integrated circuit (IC) substrate 212 and cooperating with an array of finger sensing elements 214 on the IC substrate. The method may further include performing matching using the match score on match circuitry 218 on the IC substrate 212.

The watermark may be verified through correlation with at least one match score using watermark verification techniques (e.g., reference to C. Rey and J. Dugelay, A Survey of Watermarking Algorithms for Image Authentication, EURASIP Journal on Applied Signal Processing, pp. 613-621, 2002).

C. Third Embodiment

Figure 4:
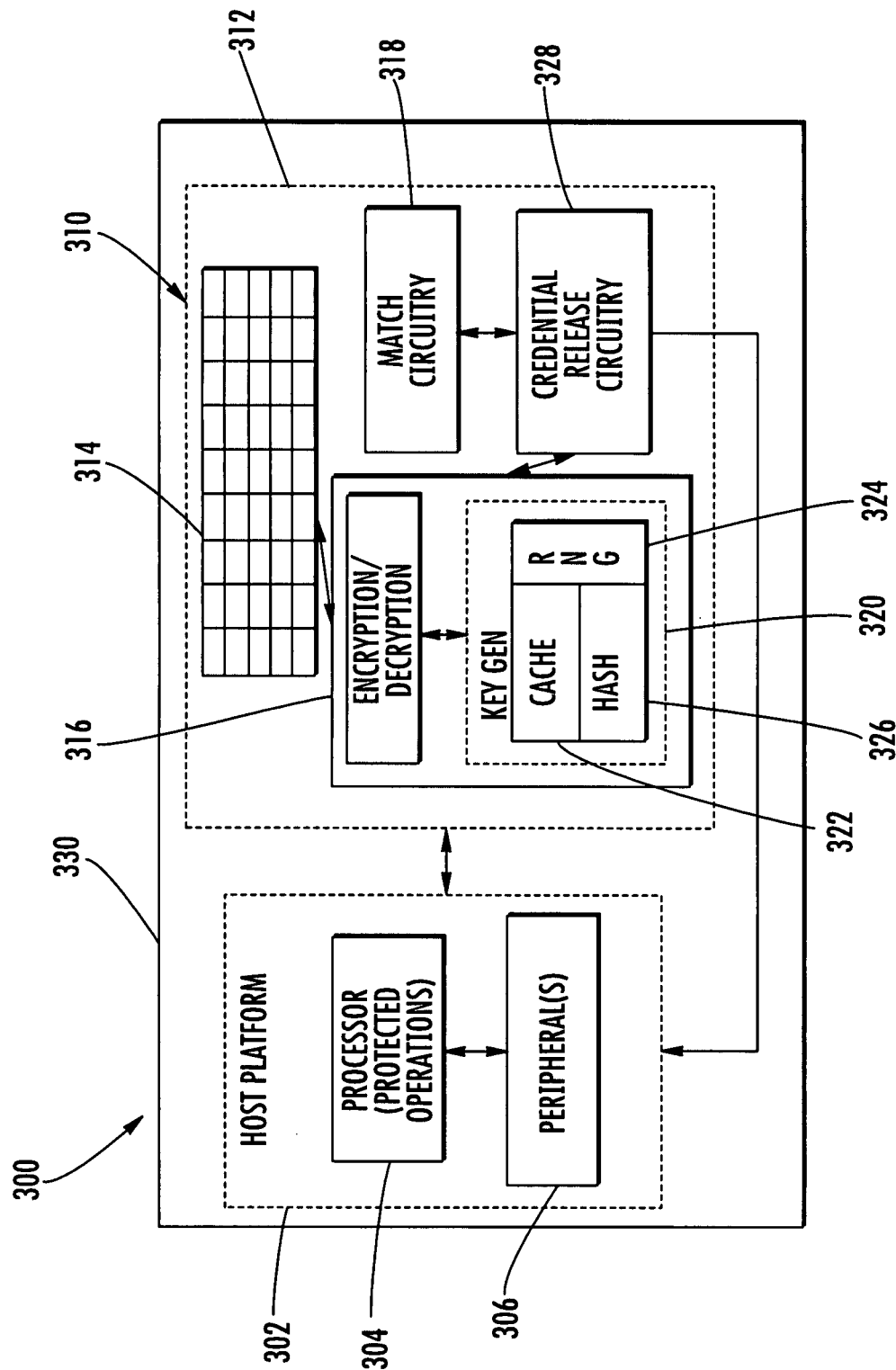
FIG. 4 is schematic block diagram of a third embodiment of a finger sensing apparatus using encryption/decryption in accordance with the present invention.

Referring now additionally to FIG. 4, further details of a third embodiment of a secure electronic device 300, such as the computer 10 of FIG. 1, will be described. The device 300 illustratively includes a host platform 302 having a processor 304 and other associated peripherals 306.

The finger sensing apparatus 310 illustratively includes an integrated circuit (IC) substrate 312, an array of finger sensing elements 314 on the (IC) substrate, and encryption circuitry 316 on the IC substrate 312 cooperating with the array of finger sensing elements 314 for encrypting a user template comprising finger template data and at least one user credential. For example, the at least one user credential may enable another device, such as the host platform 302, to perform at least one protected operation to thereby enhance security.

The encryption circuitry 316 may encrypt the user template based upon a template encryption key. The encryption circuitry 316 further may encrypt the at least one user credential based upon a payload encryption key. Key generation circuitry 320 may be provided on the IC substrate 312 for generating the template encryption key and the payload encryption key.

A key cache 322 may be provided on the IC substrate 312 for storing the template encryption key and the payload encryption key therein. The key generation circuitry 320 further illustratively includes a random number generator 324, and an associated hash engine 326 cooperating therewith for generating the template encryption key and the payload encryption key.

The encryption circuitry 316 of the finger sensing apparatus 310 also includes decryption circuitry on the IC substrate 312 and cooperating with the key cache 322 to decrypt the user template based upon the template encryption key and the payload encryption key. The finger sensing apparatus 310 may also include match circuitry 318 on the IC substrate 312 for performing finger matching based upon at least the user template, and credential release circuitry 328 on the IC substrate 312 and cooperating with the match circuitry 318 for releasing the at least one user credential based upon finger matching.

The host platform 302 is external from the IC substrate 312 and may perform at least one prematch function. For example, the at least one prematch function may comprise generating at least one match score for use by the match circuitry 318. A common housing 330 may carry the IC substrate 312 and the host platform 302.

A method aspect for this third embodiment is also for finger sensing. The method may include encrypting a user template comprising finger template data and at least one user credential using encryption circuitry 316 on an IC substrate 312 cooperating with an array of finger sensing elements 314 also on the IC substrate.

D. Fourth Embodiment

Figure 5:
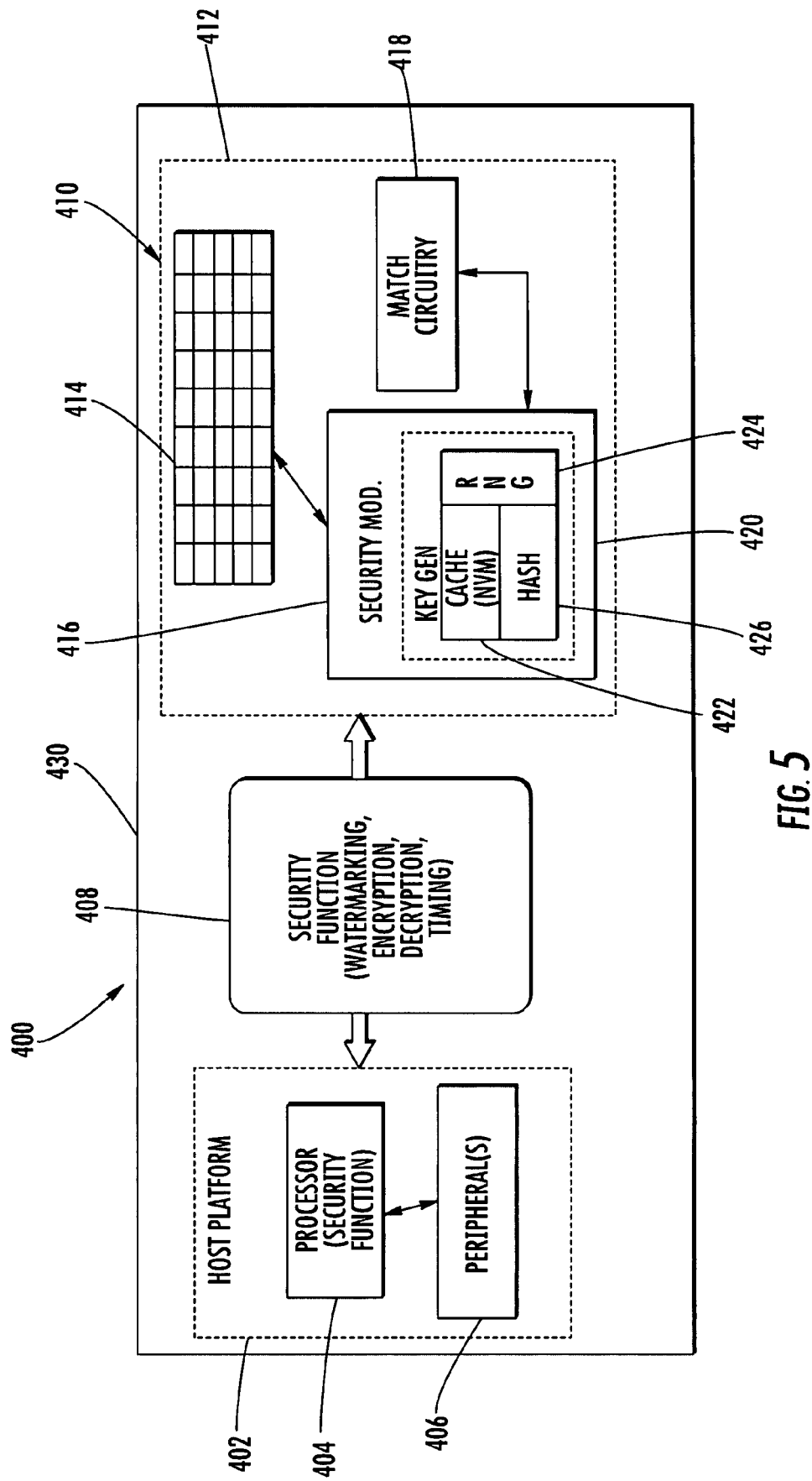
FIG. 5 is schematic block diagram of a fourth embodiment of a finger sensing apparatus using hybrid matching in accordance with the present invention.

Referring now additionally to FIG. 5, further details of a fourth embodiment of a secure electronic device 400, such as the computer 10 of FIG. 1, will be described. The device 400 illustratively includes a host platform 402 having a processor 404 and other associated peripherals 406.

The device may define a finger sensing apparatus including a finger sensor 410 having an integrated circuit (IC) substrate 412, an array of finger sensing elements 414 on the IC substrate, and match circuitry 418 on the IC substrate for performing final finger matching. The host platform 402 may cooperate with the array of finger sensing elements 414 for performing at least one finger prematch function. In addition, the finger sensor 410 and the host platform 402 may implement at least one security function 408 therebetween. Accordingly, security of the finger sensing is enhanced.

For example, the at least one security function 408 may comprise at least one watermarking function. The at least one watermarking function, in turn, may comprise at least one of finger image data watermarking, and finger template data watermarking, as described in other embodiments. In addition or alternatively, the at least one security function may comprise at least one encryption/decryption function, as also described in other embodiments. The at least one encryption/decryption function may comprise at least one of encryption of a user credential, a user template, and communication between the finger sensor and the host platform, for example.

The finger sensor 410 further illustratively includes a security module 416 on the IC substrate 412 and including key generation circuitry 420 having a random number generator (RNG) 424, a hash engine 426 cooperating with the RNG for generating at least one security key, and a key cache 422 for storing the at least one security key. The key cache 422 of the finger sensor 410 may be further defined by at least a portion of a nonvolatile memory on the IC substrate.

The at least one security function may comprise at least one timing function. The at least one prematch function performed by the host platform 402 may comprise generating at least one match score for use by the match circuitry 418 of the finger sensor 410. A common housing 430 may carry the finger sensor 410 and the host platform 402.

A method aspect for this fourth embodiment is also for finger sensing. The method may comprise performing final finger matching using a finger sensor 410 comprising match circuitry 418 on an integrated circuit (IC) substrate 412 and an array of finger sensing elements 414 on the IC substrate, performing at least one finger prematch function using a host platform 402 cooperating with the array of finger sensing elements, and implementing at least one security function 408 between the finger sensor and the host platform.

E. Fifth Embodiment

Figure 6:
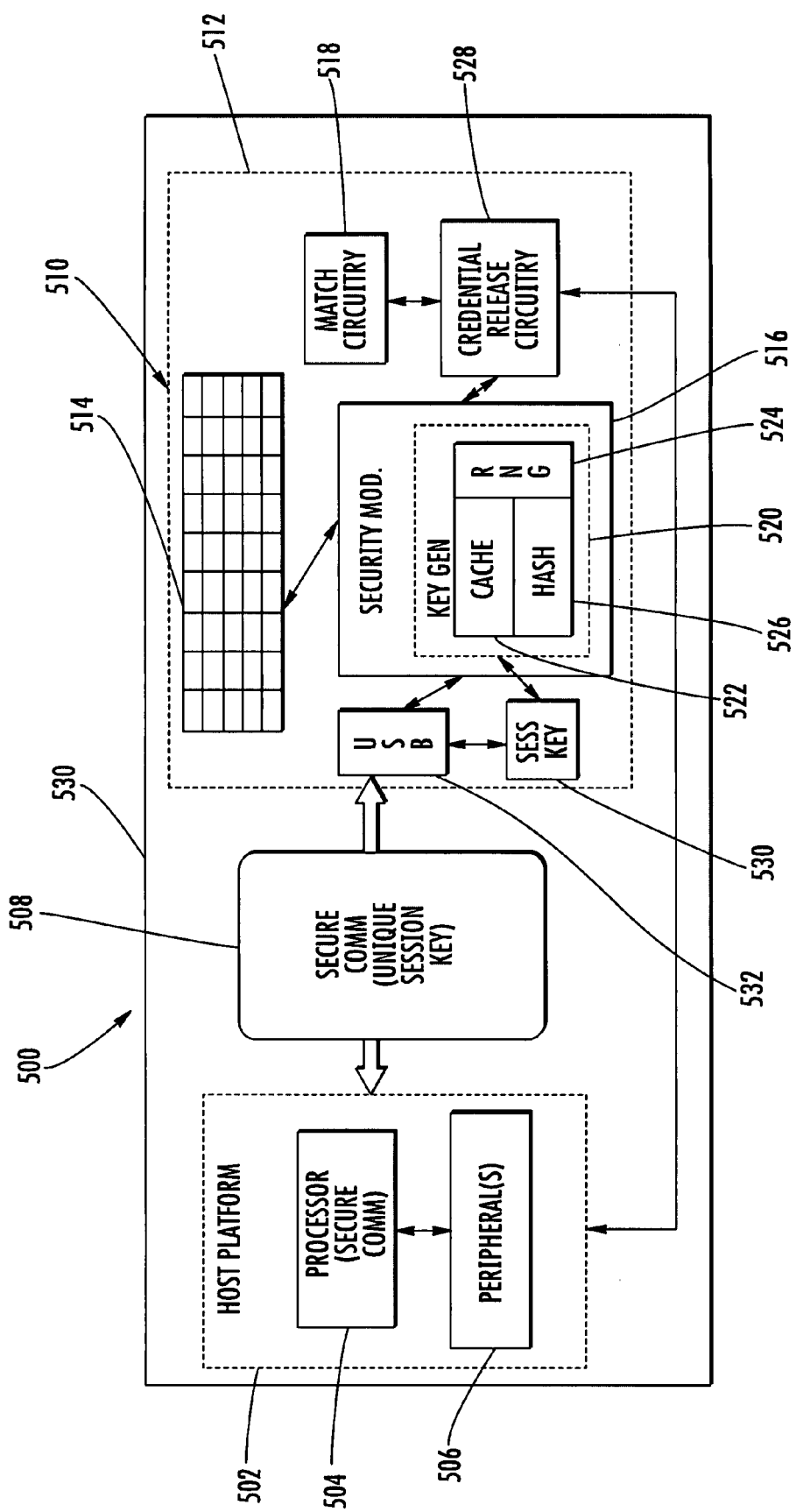
FIG. 6 is schematic block diagram of a fifth embodiment of a finger sensing apparatus using a unique session key in accordance with the present invention.

Referring now additionally to FIG. 6, further details of another embodiment of a secure electronic device 500, such as the computer 10 of FIG. 1, will be described. The device 500 illustratively includes a host platform 502 having a processor 504 and other associated peripherals 506.

The device 500 may define a finger sensing apparatus including a finger sensor 510 comprising an integrated circuit (IC) substrate 512, an array of finger sensing elements 514 on the IC substrate, and session key negotiation circuitry 530 on the IC substrate. The host platform 502 is external from the finger sensor 510 and cooperates with the session key negotiation circuitry 530 to negotiate a unique session key for secure communication 508 with the finger sensor during a respective communication session therewith. Accordingly, security of communication between the finger sensor 510 and host platform 502 is enhanced.

The session key negotiation circuitry 530 may implement a Diffie-Hellman key negotiation, for example. In addition, the host platform 502 may initiate a session key negotiation.

The finger sensor 510 further illustratively includes Universal Serial Bus (USB) communication circuitry 532 thereon for communicating with the host platform 502 and using the unique session key, for example. The finger sensor 510 and the host platform 502 may use a given unique session key during a plurality of enrollment steps. Also, the finger sensor 510 and the host platform may use a given unique session key during a given match step.

The finger sensor 510 may further comprise a security module 516 on the IC substrate 512 and including key generation circuitry 520 having a random number generator (RNG) 524, a hash engine 526 cooperating with the RNG for generating at least one security key, and a key cache 522 for storing the at least one security key.

The finger sensor 510 may further comprise the illustrated match circuitry 518 on the IC substrate 512 for performing finger matching, and credential release circuitry 528 on the IC substrate and cooperating with the match circuitry for releasing the at least one user credential based upon finger matching.

The host platform 502 may perform at least one prematch function. For example, the at least one prematch function may comprise generating at least one match score for use by the match circuitry 518 of the finger sensor 510. In an electronic device form, such as a laptop, cellphone or PDA, the apparatus may further comprise a common housing 530 carrying the finger sensor 510 and the host platform 502.

A method aspect for this fifth embodiment is for finger sensing. The method may include negotiating a unique session key for secure communication 508 between a finger sensor 510 and a host platform 502 during a respective communication session therewith. In addition, the finger sensor 510 may comprise an integrated circuit (IC) substrate 512, an array of finger sensing elements 514 on the (IC) substrate, and session key negotiation circuitry 530 on the IC substrate cooperating with the host platform.

F. Sixth Embodiment

Figure 7:
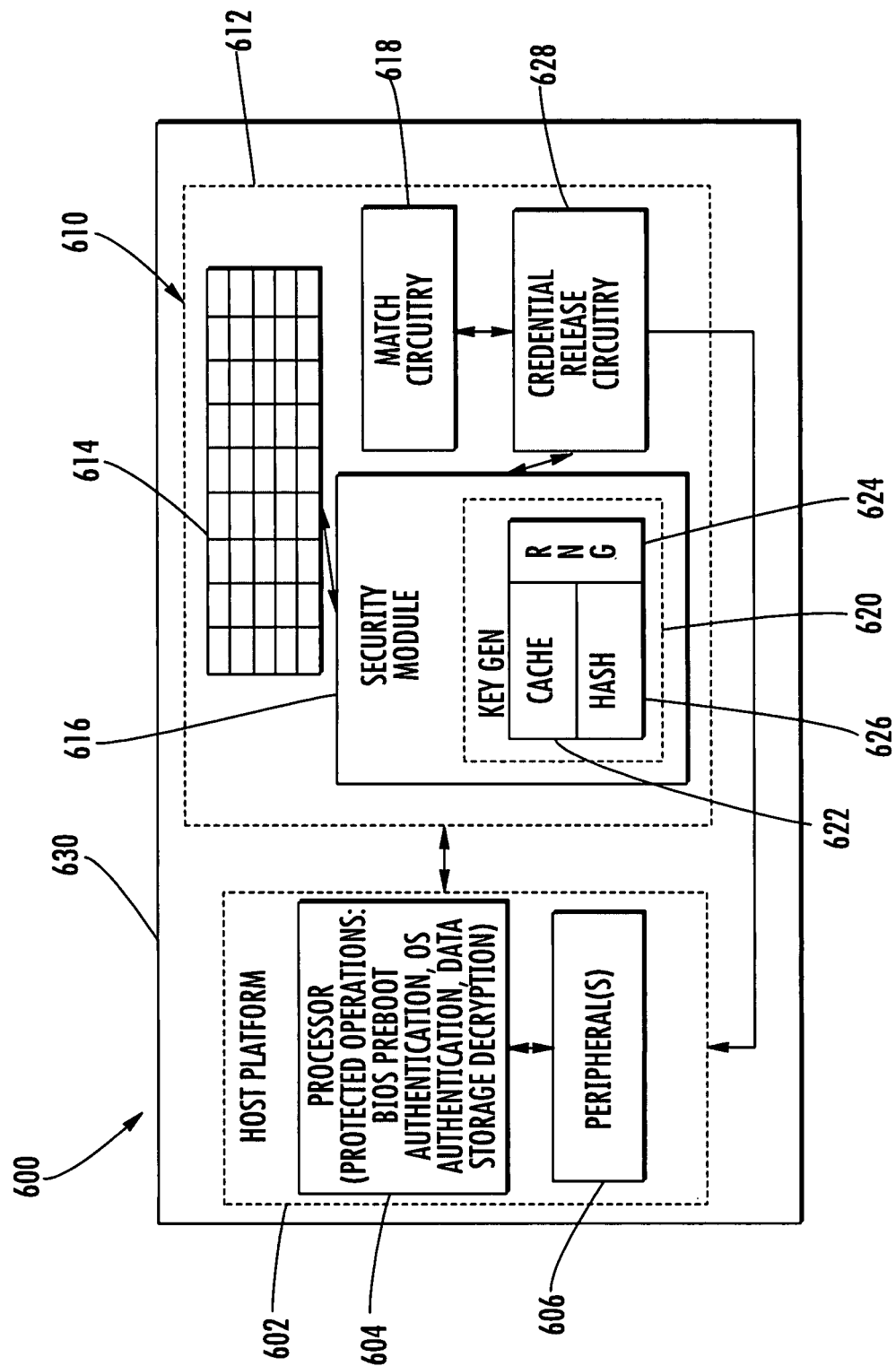
FIG. 7 is schematic block diagram of a sixth embodiment of a finger sensing apparatus using secure credential release from the sensor in accordance with the present invention.

Referring now additionally to FIG. 7, further details of another embodiment of a secure electronic device 600, such as the computer 10 of FIG. 1, will be described. The device 600 illustratively includes a host platform 602 having a processor 604 and other associated peripherals 606.

The finger sensing apparatus 610 illustratively includes an integrated circuit (IC) substrate 612, an array of finger sensing elements 614 on the IC substrate, match circuitry 618 on the IC substrate for performing finger matching, and credential release circuitry 628 on the IC substrate. The credential release circuitry 628 may cooperate with the match circuitry 618 for releasing at least one user credential based upon finger matching for enabling another device, such as the host platform 602, to perform at least one protected operation. Accordingly, the user may use a single finger match to securely have one or more protected operations performed.

The finger sensor 610 may further comprise a security module 616 on the IC substrate 612 and including key generation circuitry 620 having a random number generator (RNG) 624, a hash engine 626 cooperating with the RNG for generating at least one key, and a key cache 622 for storing the at least one key to be used by the match circuitry 618. The at least one user credential may comprise at least one of a user password, passphrase, username, certificate, and key data, for example.

In some variations, the another device may comprise the host platform 602 which is external to the IC substrate 612. The host platform 602 may perform both a BIOS preboot authentication, and an Operating System authentication based upon the release of the at least one user credential. In other embodiments, the host platform 602 may perform at least one of a BIOS preboot authentication, an Operating System authentication, and a host platform storage decryption based upon the release of the at least one user credential.

In addition, the host platform 602 may perform at least one prematch function. For example, the at least one prematch function may include generating at least one match score for use by the match circuitry 618. In some variations, the finger sensing apparatus 610 may be included in or in the form of an electronic device, such as a laptop, cellphone or PDA, that further includes a common housing 630 carrying the IC substrate 612 and the host platform 602.

A method aspect for this sixth embodiment is for enabling another device to perform at least one protected operation. The method may include determining a match using a finger sensor 610 comprising an integrated circuit (IC) substrate 612, a plurality of finger sensing elements 614 on the IC substrate, and match circuitry 618 on the IC substrate. The method may also include enabling the another device to perform at least one protected operation based upon releasing at least one user credential based upon the match and using credential release circuitry 628 also the IC substrate 612 and cooperating with the match circuitry 618.

G. Seventh Embodiment

Figure 8:
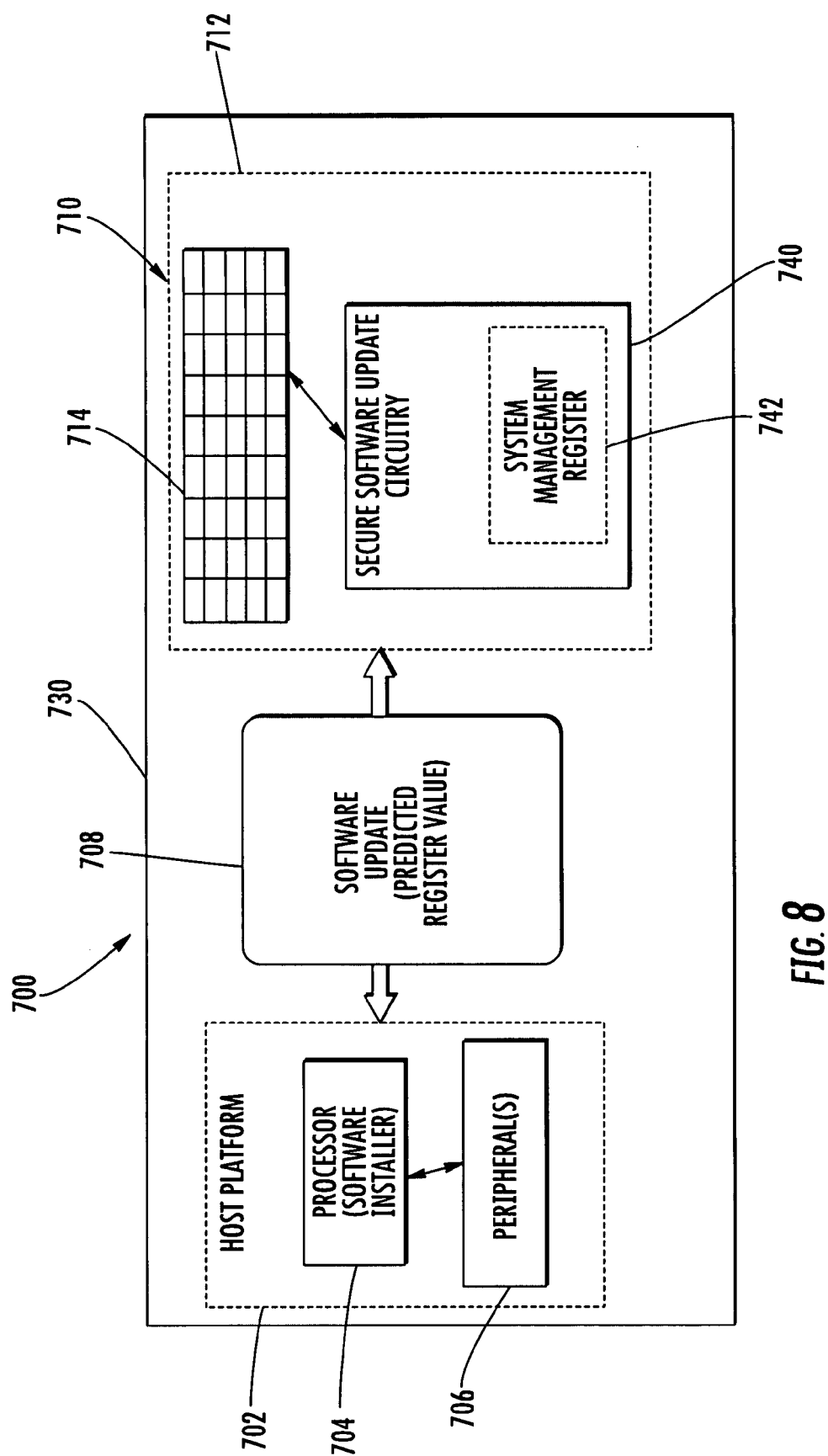
FIG. 8 is schematic block diagram of a seventh embodiment of a finger sensing apparatus implementing secure software updates in accordance with the present invention.

Referring now additionally to FIG. 8, further details of a seventh embodiment of a secure electronic device 700, such as the computer 10 of FIG. 1, will be described. The device 700 illustratively includes a host platform 702 having a processor 704 and other associated peripherals 706.

The device 700 may define a finger sensing apparatus including a finger sensor 710 comprising an integrated circuit (IC) substrate 712, an array of finger sensing elements 714 on the IC substrate, and secure software update circuitry 740 on the IC substrate. In addition, the host platform 702 is external from the finger sensor 710 and may host software associated with the finger sensor. The host platform 702 may cooperate with the secure software update circuitry 740 to authorize an attempted software update 708. If the update is not authorized, then an indication of such may not be provided to the user attempting to install the update for security reasons. Accordingly, the sensor 710 advantageously is resistant to attempts to install rogue software and overall security is enhanced.

For example, the secure software update circuitry 740 may comprise at least one register 742, such as a system management register (SMR). The finger sensor 710 and the host platform 702 may further cooperate to clear the at least one register 740. The finger sensor 710 and the host platform 702 may further cooperate to extend a software measurement value into the at least one cleared register 740 based upon the attempted software update 708. Accordingly, the secure software update circuitry 740 may compare the extended software measurement value to a predicted value therefor. In addition, the predicted value may be in the attempted software update 708.

The at least one register 742 may comprise at least one non-volatile register. In addition, the attempted software update may comprise at least one finger sensor driver software update. In some variations, the finger sensing apparatus 700 may be in the form of an electronic device, such as a laptop, cellphone or PDA, that further comprises a housing carrying the finger sensor and the host platform.

A method aspect is for updating software of a host platform 702 hosting software associated with a finger sensor 710. The method may include using secure update circuitry 742 on an IC substrate 712 of the finger sensor 710 also comprising an array of finger sensing elements 714 on the IC substrate in cooperation with the host platform 702 to authorize an attempted software update. The method may further include updating the software of the host platform 702 based upon a successful authorization of the attempted software update.

H. Additional Examples

Further details of exemplary embodiments including features of the present invention will be described below with reference to FIGS. 9-17. Initially, some terminology used in such description will be discussed. A global attack means any attack on the security system that can be perfected on one machine and then used on every machine that uses the same system. It is also sometimes referred to as a BORE attack (Break Once Run Everywhere). Flash memory is non-volatile computer memory that can be electrically erased and reprogrammed. A Non-volatile memory (NVM) is memory that survives when the device is powered down. Sensor Measurement Registers (SMR) provide a capability to measure several system components using the sensor hardware. Pre-match processor (PMP) includes code that runs on the host and performs much of the CPU intensive portions of the matching operations.

Single Swipe to Desktop" (SSD) is functionality that allows the user to authenticate once during pre-boot and have their credentials passed to subsequent steps in the boot sequence, such as the operating system boot. A key is a piece of information (a parameter) that controls the operation of a cryptographic process. In encryption, a key specifies the particular transformation of plaintext into ciphertext, or vice versa during decryption. The Key Encryption Key (KEK) is used to authorize changes to the AKEY. The KEK is generally changed every boot unless the trusted platform module (TPM) is used to protect the KEK (this is a user policy decision). The Application Key (AKEY) may be used by the sensor to encrypt and decrypt all secure data exchanged between the host and the sensor. The AKEY is changed for every secure session.

Diffie-Hellman (DH) is a well-known secure key-exchange process that allows two devices to negotiate a shared key. Its primary benefit is that the negotiation can occur in the open but an eavesdropper hearing all communications cannot determine the shared key. Ephemeral Paired Keys (EPK) include two keys referred to as $K_{ENCRYPT}$ and $K_{CHANGE}$. $K_{ENCRYPT}$ is used for cryptographic operations such as signing messages or encrypting information. $K_{CHANGE}$ is only used to change $K_{ENCRYPT}$. A Secure Hash Algorithm (SHA), e.g. SHA-1, is designed by the National Security Agency (NSA) and published by the NIST as a U.S. Federal Information Processing Standard.

Some high level security features may be implemented by the various embodiments described herein. These features are described below. The general goal may be to provide good security when the user does not opt-in their TPM and best-in-class security when the user does opt-in their TPM. Good security in this context means that, at a minimum, the system will be strongly resistant to global attacks. Best-in-class security means that the system must equal the security provided by a match-on-sensor scenario, but without the matcher and user limitations that scenario entails.

Some non-TPM desired features may include: the matcher should be protected from tampering during storage and execution; the templates should be protected from tampering during storage, this protection includes both modification to existing individual templates and the substitution or addition of entire templates into the template store; the templates should be protected from snooping to protect privacy and hinder spoofing; the image information from the sensor module to the host should be encrypted to protect privacy and prevent electronic spoofing; upon a successful authentication, the system should return a security payload (provided at enrollment time) instead of indicating which template matched, this payload may be securely incorporated into the template using the multiple record capabilities already in use for the client-server architecture; the architecture should provide for the local area network being protected from a compromised client PC (given proper software on the server side); interfaces between the Windows fingerprint service and the Windows applications should be protected; and the encryption, key management and key exchange schemes used in the protections discussed above, should resist (to the extent possible) global attacks.

When the TPM is enabled and in the proper state, it is possible to provide a higher level of security. With this increased security capability, the architecture may meet the following additional security requirements: the security architecture can protect long-term keys against remote and software based attacks; and in the event a long-term key is obtained (using hardware attacks) the key will be useful only on a single machine.

Figure 9:
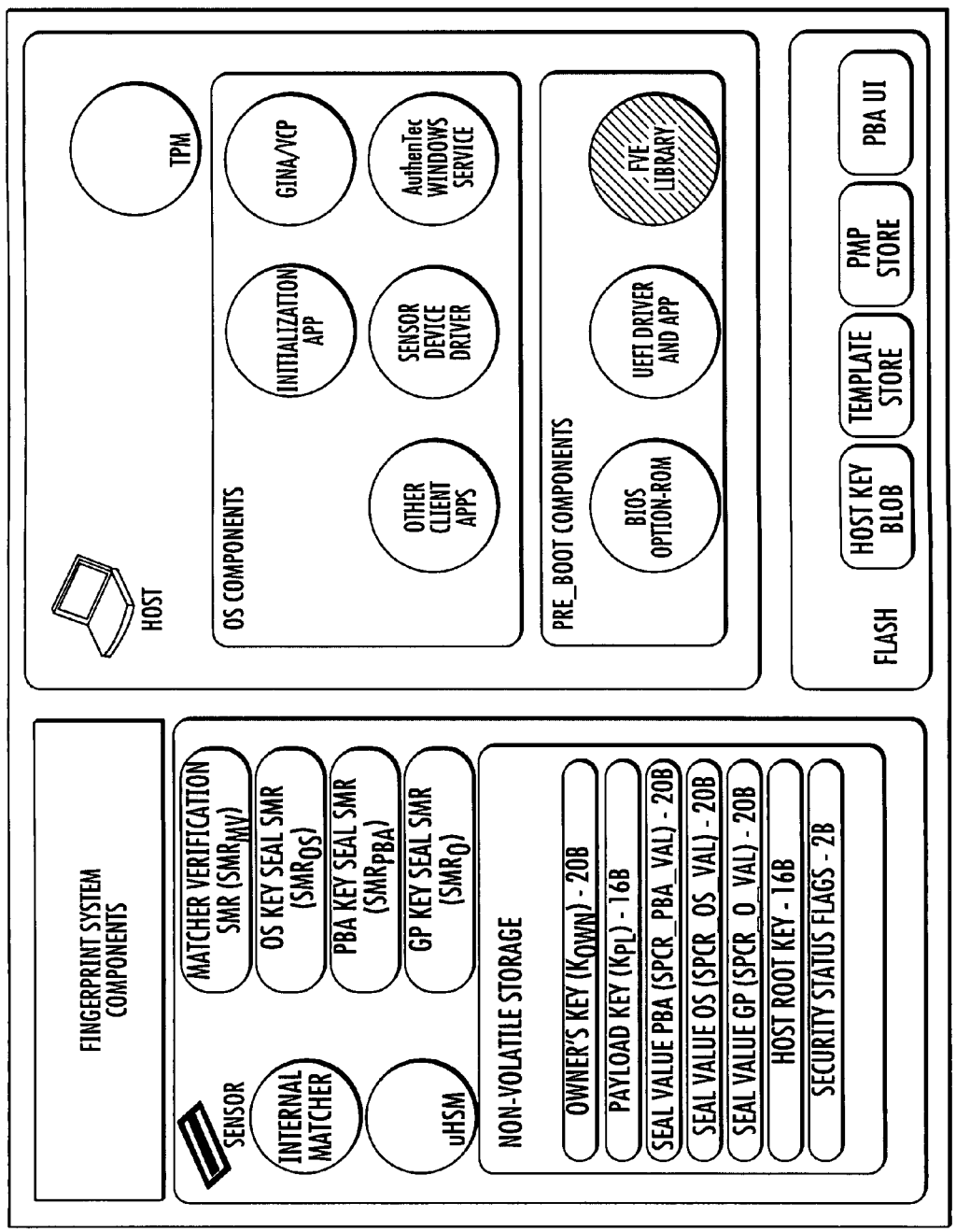
FIG. 9 is a high level schematic diagram illustrating an example of a secure sensing apparatus including components of the sensor, host and optional memory in accordance with various features of the present invention.

Referring to FIG. 9 some functionality that may be used in meeting the desired features discussed above will be described. This functionality may be embodied in both hardware and software components. This is a top-level description of the various security components and their respective locations. The sensor components may include a Micro Hardware Security Module (µHSM) which may be built directly into the sensor silicon and may perform several important cryptographic functions including: Unique device identity through a unique private key that the µHSM generates during sensor final test, this key is stored and is never released outside the µHSM module; a random number generator for use in creating keys, nonces and seed values; a SHA-1 engine for digital signature creation and code measurements; an AES-CCM engine for encrypting images, templates, etc.; and a PKE engine for accelerated Diffie-Hellman and DSA operations. All cryptographic operations in the sensor may be performed by the µHSM under control of the sensor logic.

The secure sensor may contain logic that allows it to perform the final stage of matching operations. The pre-match processor (PMP) software on the host performs the most complex and CPU intensive work and provides the intermediate results to the sensor. The sensor's internal matcher then validates the data from the host, for example, using image watermarking information and calculates the final matching scores.

The sensor may contain four sensor measurement registers. The sensor logic uses the µHSM's SHA1 engine and its private key to concatenate measurements into these registers. The process for this works in such a way that once a new measurement is concatenated into one of these registers, it is computationally impossible to determine a new measurement that will take the SMR back to a value that matches a previous state. In addition, the concatenation process ensures that when starting from an initialized state, concatenating the same exact measurements in the exact same order will always result in the exact same value in the SMR on a given sensor.

The host software provides the measurements that will be concatenated into the SMRs and, during initialization and enrollment operations, instructs the sensor logic to save certain SMR values into nonvolatile memory. During subsequent operations, the sensor logic can compare the current SMR values against the stored values. If these values are identical, then the sensor logic authorizes the release of particular items of cryptographic information.

Once the host has obtained the required cryptographic information it can then provide a random measurement to the sensor for the SMR(s). This has the effect of preventing any future entity from obtaining access to the secret information. There may be four SMRs in the secure sensor, each having a different purpose. $SMR_{OS}$ is used by the device driver to measure itself, the platform and the matcher. Once these measurements have been validated by the sensor, the host will be authorized to request a copy of the current Host Root Key (HRK). $SMR_{PBA}$ is used by the BIOS Option ROM to measure itself, the platform and the matcher. Once these measurements have been validated by the sensor, the host will be authorized to request a copy of the current Host Root Key (HRK). $SMR_0$ may be reserved for use by other entities such as $3^{rd}$ party matchers. $SMR_{MV}$ is used by the Matcher and Sensor to secure the template contents and tie it to the specific sensor, machine and matcher. The value of this register may not be saved in NVM like the others, but may be instead encrypted into each template at enrollment time using the sensor's payload key. The sensor may decrypt and check it at match time to ensure that the template and its secure payload have not been tampered with and were produced using the current sensor and on the current machine.

The secure sensor may include a Non-Volatile Memory (NVM), e.g. containing 128 bytes of re-writable flash memory. This memory may be used to store long-term keys for both the sensor and the host, saved SMR values, and status flags. The contents of this memory may only be visible to the sensor logic. The secure sensor may also contain a watchdog timer that is used to prevent debugger or in-circuit emulator attacks on the fingerprint security system by keeping track of how long it takes the host to perform certain operations.

Several components that relate to fingerprint based security may be resident on the host and will be described with further reference to FIG. 9. Some of these components may operate prior to the primary OS boot event, others may only run within the OS environment. The following provides a high-level description of these components.

The BIOS Option ROM is an optional component that links into the BIOS image and provides for both asset protection and data protection. This is a secure pre-boot authentication method since it is difficult to change the contents of the bios without the owner's knowledge. This provides enhanced-root-of measurement assurance. This component allows or requires the user to perform fingerprint authentication before the OS is allowed to begin the boot process. For example, this makes the computer, e.g. laptop, useless to anyone who might steal it. Depending on the data storage approach, the hard disk does not need to be unlocked before this authentication is performed. This provides additional protection for the data on the drive. The option ROM may provide an optional capability for single swipe to desktop (SSD). This feature may be under owner policy control.

In a Unified Extensible Firmware Interface (UEFI) capable system, the UEFI driver and application replace the option ROM that is used in the traditional BIOS systems. The level of security provided may match that provided by the option RON approach if the UEFI specification is updated with additional security features. The UEFI components may be stored on a special partition of the primary hard drive. The driver uses the UEFI framework functions to establish USB communication with the sensor.

The Full Volume Encryption (FVE) Library may be an x86 library that will be linked into an application which provides full hard drive encryption. For example, this could be Safeboot's FDE product or Microsoft's Bitlocker. Typically, these Encryption systems run after PBA but before OS boot. The library may provide all of the functionality necessary to operate properly with the secure sensors.

The OS Sensor Device Driver may perform all functions that should be performed in a high-security environment. Since the driver runs at ring 0, it is harder to interfere with its operations so it can operate much more securely. The driver functionality may include: Encryption and decryption of data moving between the host and the secure sensors; Pre-match processing for the secure match along with the full matcher operations during the one-to-many portion of an identify transaction; Diffie-Hellman key negotiation between the host and the secure sensors; and Cross-authentication with the service.

The OS service provides a secure interface between applications and the fingerprint system. The expected functionality may include: Provides API functions that allow trusted applications to request fingerprint system operations; Provide a method of determining what applications are "trusted", including the possibility of different levels of authorization, i.e., a subset of operations can only be performed by certain applications and not by others; Provide a method of establishing a secure communication channel between the software components above and below it in the stack, this means that all data transferred between the application and the service and between the service and the driver should be resistant to snooping and tampering; Provide logic to perform fingerprint system initialization, much of the fingerprint system initialization happens under control of the service; Prevent all other fingerprint operations until initialization is complete; and Provide a channel for user prompts and feedback between the device driver and the application.

The OS Login Application (GINA/VCP) software component is responsible for providing user credentials to the OS during login. This present approach may assume that the login application will use information stored in the Application Payload (AP) or information derived from data contained in the AP to authorize the login. To accomplish this task the application may request the AP from the service. This will cause the fingerprint system to either return an AP that was released in a previously successful fingerprint authentication (such as Pre-boot or full volume encryption), or in the initiation of a new fingerprint authentication sequence.

If a new authentication sequence is required then the login application must provide prompts and feedback to the user based messages from the fingerprint system.

The OS Initialization Application software component will normally run only once during a particular user's ownership of a PC. It should run before any other fingerprint system operations become available. In the course of the initialization, the application will need to obtain information from the user. This information may include an owner pass-phrase and fingerprint system policy information. The initialization component may need to operate across a system reboot to complete all operations.

Other client applications may be needed to provide password replacement capability in web pages and dialog boxes, authorize folder and file encryption and decryption, and perform other fingerprint based authorization operations as needed.

The data store system for the present fingerprint security architecture is not limited to any one storage medium, but the sensor flash storage approach may be preferred from a security viewpoint. The sensor flash data storage approach may be the only approach that can prevent a global denial service attack. This is possible because the sensor can prevent writes and erasures of the flash except when a user has authenticated. The data store should provide a location, or locations, where templates, the pre-match processor, host key blobs, and PBA loadable binaries can be stored and made accessible to both the OS and pre-boot software components. If necessary, the OS and pre-boot data store can be separate but duplicate stores. This is not required in the case of sensor flash which is another reason to prefer it over other data storage approaches.

Earlier versions of fingerprint security systems simply returned an index indicating which template matched a live sample. The application would then retrieve security material from its own storage based on this answer. The problem with this approach is that it is possible for a hacker to replace our entire software and hardware stack with a simple Dynamic-link library (DLL) that just always returns a valid index number regardless of what finger is presented. In fact, no finger need be present at all. Even if the application and the software cross-authenticate, there is still a single, locatable, point of attack where malicious software can change the returned answer to anything desired.

In various embodiments, the present approach may seek to eliminate these types of attack by fundamentally changing the way the application and fingerprint system interact. In the present approach, the application may provide a payload containing security material to the fingerprint system during enrollment. The fingerprint system may keep the payload secure until a matching finger is validated; at which point it returns the payload to the application. With this approach, replacing the fingerprint system or altering its answer accomplishes nothing since the application cannot continue operation without the security material contained in the payload.

Suppose that an application will allow a user to login to an OS using a finger swipe. The following table shows the events that may occur in the conventional approach versus the present approach.

| Conventional | Present Approach |
|---|---|
| Application requests fingerprint authentication | Application requests fingerprint authentication |
| Fingerprint system obtains live sample | Fingerprint system obtains live sample |
| Templates are matched against live sample | Templates are matched against live sample |
| Matching template is determined (if any) | Matching template is determined (if any) |
| The application is notified which template matched (if any) (this is a Single point of attack) | Secure payload is retrieved from the template and decrypted inside the sensor |
| Application uses return information to lookup user credentials from its own store | User credentials from the payload are returned to the application. |

As can be seen in the example, it does no good for the hacker to change the answer returned from the present approach because the answer must be a valid set of user credentials. If the hacker already knows the credentials, then there is no reason to attack the fingerprint system. They already have all of the information they need to login to the OS.

The following is a discussion regarding various features of communications security that may be present in the various embodiments. A Sensor to Host (Driver) Secure Session may be provided. Since the sensor may perform the decryption of the secure payload, data transferred between the sensor and host may be protected against snooping. This may be accomplished through the establishment of a Secure Session. Once the secure session has been established, all image and security material sent by the sensor may be encrypted using an AES128-CCM encryption scheme, for example. The encryption may be keyed using a shared key that may be created during the initialization of the secure session. The shared encryption key may be obtained in several different ways depending on the current state of operations, but regardless of what method is used to establish the key, it should be a new key for each secure session. Secure sessions generally last for a single transaction. This will ensure that each image is encrypted with a new key. Further details on establishing the secure session are provided below.

A Client Application to Service Secure Communications may be provided. The communication channel between the service and any client application may accomplish two goals: Protect all data and command flow between the two entities from snooping and tampering; and second, to establish trust between the application and the service. These two goals may be achieved using two separate security approaches. Snooping and tampering may be prevented using the Secure Socket Layer protocol between the client and the service. Secure Socket Layer (SSL) Protocol is an industry standard protocol that allows any two entities to negotiate and create a secure channel of communication without knowing anything about each other in advance. Details of this protocol are known to those skilled in the art.

Trust may be established between the entities using paired rolling keys, joined to a unique client ID. These keys may be used to sign or (further) encrypt all messages transferred between the service and the client. Note that the usage and management of the paired rolling keys may happen inside the SSL session so there are actually two layers to the security in operation. Details on the implementation of paired rolling keys can be found below.

The functionality for both the SSL and the revolving keys may be implemented in a static library. This library may be linked into the client application by the application provider and may also provide a secure API. Also note that the initial values for the rolling paired keys and the client ID may also be placed in this library. The current value of the key pair may need to be stored securely by the client application and by the service. The service may store a pair for each application along with the client ID they belong with.

Service to Driver Secure Communications may be provided. The communication channel between the service and device drivers may protect all data and command traffic from both snooping and tampering. In addition, the two entities may be able to cross-authenticate. To accomplish this task the service and driver may use elements of SSL to create a new secure interface each time the driver and service connect. Once connected, the two entities may also cross-authenticate using paired rolling keys. The starting values of these keys may be hard-coded, but may change at random after the first connection.

A general sequence of events may include: Service detects driver and begins connection process, Driver initiates SSL negotiation, Driver and Service complete SSL key negotiation, these keys will remain in effect until the next time the driver and service connect, this may be a plug-n-play event or a reboot; Driver initiates cross-authentication with the Service using paired rolling keys, if first time on this machine; Driver and Service re-authenticate on each Service presence check made by the Driver.

There may be an option to provide secure images directly from the sensor to a server based application without ever decrypting them along the way. In general, this may be achieved using the same secure communications channel as with any other client. The addition to that is that the client may provide a unique key for use by the sensor during it's acquisition of the image. This key may be installed in the sensor as the current AKey and may be used to encrypt the image slices as they are delivered to the driver. The driver and service may simply transfer these slices directly up the chain to the server-based application where the statically linked client library will perform the decryption and image processing.

The following description provides example step-by-step process descriptions for each of the main functions the system may perform.

Creating a Secure Sensor Communication Session: A secure session is in existence when a new data encryption key has been created on the host and installed in the sensor's μHSM. Sessions are terminated by the host using a terminate session command. The key used for data encryption is called the Application Key (AKEY). This key is set into the sensor μHSM by the host, using the Key Encryption Key (KEK). Therefore, the KEK must be set into the μHSM before new AKEYs can be installed.

In this approach, KEKs are generally used throughout a particular boot, while AKEYs may be changed for every secure session. KEKs are maintained longer to reduce the time required to establish a new secure session. Depending on the current state of the system, establishing a new KEK can take up to half a second. There are multiple methods for establishing the KEK. The method used in a particular case depends on the current state of the sensor and host. The following table lists the states and describes their characteristics.

No KEK This state occurs whenever the host is rebooted and no TPM sealed copy of the Key Encryption Key (KEK) exists. Note that during a normal boot sequence, this state may occur both at pre-boot and again when the device driver loads.

KEK Sealed This state indicates that the owner has elected to use the TPM to protect the KEK. In this case no new DH negotiation is needed for each boot. Instead, the KEK and wrapped KEK are sealed to the TPM and placed in the data store during initialization (or during a policy change).

KEK Wrapped In this state, the host has a memory-based copy of the KEK and "wrapped" KEK and is ready to load the KEK into the μHSM. This state can occur if the sensor has lost power and the host has not.

KEK Loaded In this state, the KEK has been successfully installed into the sensor's μHSM. This state should exist before secure sessions can be established.

Assuming the KEK has not been sealed to the TPM (based on sensor flags) and the host is booting into PBA or the OS (State==No KEK), the host may perform the following operations to move to the KEK Loaded state:

1—Before a OH session can be initiated between the host and the sensor, a change authorization command should be run on the μHSM. This command uses a message containing a public key and a private key that is obfuscated into the driver. The public key message is signed with the manufacturer's private key ($KM_{PRIV}$) The signature is checked by the μHSM using its copy of the manufacturer's public key ($KM_{PUB}$). This approach avoids the use of key servers.

2—Once the change authorization has completed successfully, a Diffie-Hellman (DH) negotiation is performed between the μHSM and the host. The result of this operation is a temporary session protection key ($K_{SP}$). Note: as part of preparations for the DH negotiation, the host should create a temporary digital signature algorithm (DSA) key.

3—The host generates a new random key to be used as the KEK.

4—The host uses $K_{SP}$ to encrypt the KEK and then uses a DH Message to install the new KEK into the μHSM KEK local register.

5—The host then instructs the μHSM to "wrap" the KEK. The μHSM encrypts and signs the KEK using an internal private key and provides it to the host. This wrapped KEK can only be decrypted by this particular sensor.

6—Once the host has the wrapped KEK, the state transitions to "KEK Loaded". It is now possible to set an AKEY and establish a secure session.

Assuming the KEK has been sealed to the TPM (based on sensor flags) and the host is booting into either PBA or the OS (State=="KEK Sealed"), the host performs the following operations to move to the KEK Loaded state:

1. The host reads the KEK blob from the data store and instructs the TPM to "unseal" it. If conditions are correct to allow the unsealing operation, the TPM will decrypt the KEK blob using an internal key. The KEK blob contains both a wrapped KEK and a clear copy of the KEK.
2. The host passes the wrapped KEK to the sensor μHSM and instructs it to un-wrap the KEK into the local KEK register.
3. Once the μHSM has unwrapped the KEK, the state transitions to "KEK Loaded". It is now possible to set an AKEY and establish a secure session.

Assuming the host has a memory-based copy of both the KEK and the wrapped KEK (State=="Wrapped KEK"), the host performs the following operations to move to the KEK Loaded state:

1. The host passes the wrapped KEK to the sensor μHSM and instructs it to un-wrap the KEK into the local KEK register.
2. Once the μHSM has unwrapped the KEK, the state transitions to "KEK Loaded". It is now possible to set an AKEY and establish a secure session.

Once the system is in the "KEK Loaded" state, secure sessions can be opened and closed at will. This is accomplished using the following steps.

1. The host generates a new random key to use as the AKEY for this session. During the session, all sensitive data will be encrypted using this key.
2. The host creates a new μHSM_DH_MSG containing the AKEY and protected by the KEK. The message is then sent to the sensor μHSM.
3. The sensor decrypts and validates the message. If the message is valid, the μHSM sets its internal AKEY register to the AKEY in the message.
4. The sensor logic monitors this activity, and if the μHSM indicates a successful AKEY change, it sets the sensor state to SecureModeOn.
5. At this point the secure session has been established between the sensor and the host. The session remains open until terminated by the host using the "Terminate Secure Session" sensor command.

Paired Rolling Keys (PRK) may be used in several inter-component links within the security architecture. This section describes these keys and how they are used, created and managed. Paired Rolling Keys include two keys, which are referred to as $K_{ENCRYPT}$ ($K_E$) and $K_{CHANGE}$ ($K_C$). $K_{ENCRYPT}$ is used for cryptographic operations such as signing messages or encrypting information. $K_{CHANGE}$ is only used to change $K_{ENCRYPT}$. The initial values for these keys are normally set as default values in the binaries where they will be used. This could be public knowledge since the keys will be changed before any other operations using them will be performed.

Key management may involve the following steps:
1. The initiating software creates a new random key ($K_{E'}$) which will eventually become the new $K_{ENCRYPT}$.
2. It then uses its copy of $K_{CHANGE}$ to encrypt the new key ($K_C[K_{E'}] \rightarrow K_{EPC}$).
3. The encrypted key ($K_{EPC}$) is then sent to the receiving software component in a command. (The command will be either encrypted or signed using the current $K_E$ depending on the usage in effect.)
4. The receiving component verifies the message and then decrypts and stores the new $K_E$ using the current $K_C$.
5. Once this transaction is complete, the initiating software stores the new $K_E$.
6. The next command will be to set a new $K_{CHANGE}$ key. This is accomplished in the same way as the change to $K_{ENCRYPT}$ except that $K_{C'}$ is encrypted using the newly established $K_E$ ($K_E[K_{C'}] \rightarrow K_{CPE}$).

In this approach, the initiating component may be the entity considered higher in security. This means that between the service and clients, the service will initiate key updates, while between the service and the driver, the driver initiates. Key updates are expected to occur randomly.

The initialization may be performed under the control of an application and in cooperation with the windows Service (service), the device-driver (driver), pre-boot code, and the sensor. In addition, the pre-boot code and driver may perform certain operations prior to initialization so that the sensor measurement registers (SMRS) are in the proper state for the initialization operations. The following is a list of the actions that may be performed by various fingerprint system components when the system is in an un-initialized state. These actions can be relied upon by the initialization steps that follow.

1. Option-RON or other PBA software measures itself into the $SMR_{PBA}$ register on the sensor so the measurement is available for initialization. This measurement may be performed by the core BIOS if implemented by the BIOS provider.
2. The device driver loads, and measures portions of itself into $SMR_{OS}$ on the sensor.
3. Driver retrieves status flags from sensor to determine if initialization is complete. (In this case the INIT_COMPLETE flag is not set.)
4. The service loads and requests fingerprint system status from the driver. (In this case the driver reports that the system is not yet initialized.)
5. Client application software runs and determines that the fingerprint security system is not initialized. The user may be reminded to initialize the fingerprint system.

The following is a list of the actions that may be performed by the fingerprint system components once the user has activated initialization.

1. The initialization application will obtain an owner pass-phrase from the initializing user.
2. Application requests Service to Initialize, and passes Owner Pass-phrase to Service.
3. Service decompresses factory Pre-Match Processor (PMP) into main memory.
4. If a Pre-Boot User Interface (PBUI) binary exists, the service may also copy that binary into memory (no decompression is necessary because this binary will not be seeded).
5. Service requests Driver to perform initialization, passing owner Pass-phrase and location of PMP and PBUI as parameters.
6. The driver checks to make sure that the system is not already initialized using the sensor flags.
7. The driver establishes secure communication session with sensor.
8. The driver verifies that the OS SMRs have been extended at least once.
   a. Should report TRUE for $SMR_{OS}$;
   b. If not TRUE then make the measurement.
9. The driver instructs the sensor to generate internal keys.
10. The driver sets the owner key.
    a. Driver computes owner key from owner pass-phrase (SHA-1 hash);
    b. Driver sends Set Owner Key command to the sensor with new owner key and factory default owner key as parameters;
    c. Sensor checks old owner key against stored owner key;
    d. Sensor stores new owner key in NVM (20B).
11. If the Preserve Templates flag in the sensor is not set, then the flash is fully erased. If the flag is set, then the flash is erased except for the pages which have templates. (This flag will be set if some types of software update are in progress.
12. Driver instructs sensor to save current $SMR_{OS}$ contents to SMR_OS_VAL (in sensor NVM) by sending the Save SMRs command with the appropriate flags.
    a. Sensor automatically sets SMR_OS_VAL_SET flag to True;
    b. Note: If the corresponding VAL_SET flag is TRUE before the save, the command should be ignored and an error code returned;
    c. Note: Resetting these flags can only be performed by resetting entire system back to factory defaults using the Owner Pass-phrase.
13. If $SMR_{PBA}$ was extended, driver instructs sensor to save current $SMR_{PBA}$ to SMR_PBA_VAL (in sensor NVM) by sending the Save SMRs command with the appropriate flags.
    a. Sensor automatically sets SMR_PBA_VAL_SET flag to True;
    b. Note: If the corresponding VAL_SET flag is TRUE before the save, the command should be ignored and an error code returned;
    c. Note: Resetting these flags can only be performed by resetting entire system back to factory defaults using the Owner Pass-phrase.
14. Driver stores PBA binaries in flash.
    a. Note: SPI flash writes and erases are only allowed after a Enable Flash Update command and before the end of the current secure session.
15. Extend all SMRs with a random number to cap the SMRs to an invalid state.
16. Upon storage completion, the driver instructs the sensor to set the InitComplete Flag using the Update Policy command.
    a. Note: Setting the InitComplete Flag requires Owner_Key;
17. Driver wipes Owner_Key memory location.
18. Driver Saves NVRAM backup, hash value and wrapped key to spy flash.
19. Driver invalidates Secure Session.
20. Initialization Complete.
21. Service returns control to application.
    a. Recommend proceeding immediately to enrollment for the owner and then to the policy setting operation. The policy setting operation requires the owner pass-phrase so if it is done immediately, the application will not need to re-obtain it from the owner.

Figure 10:
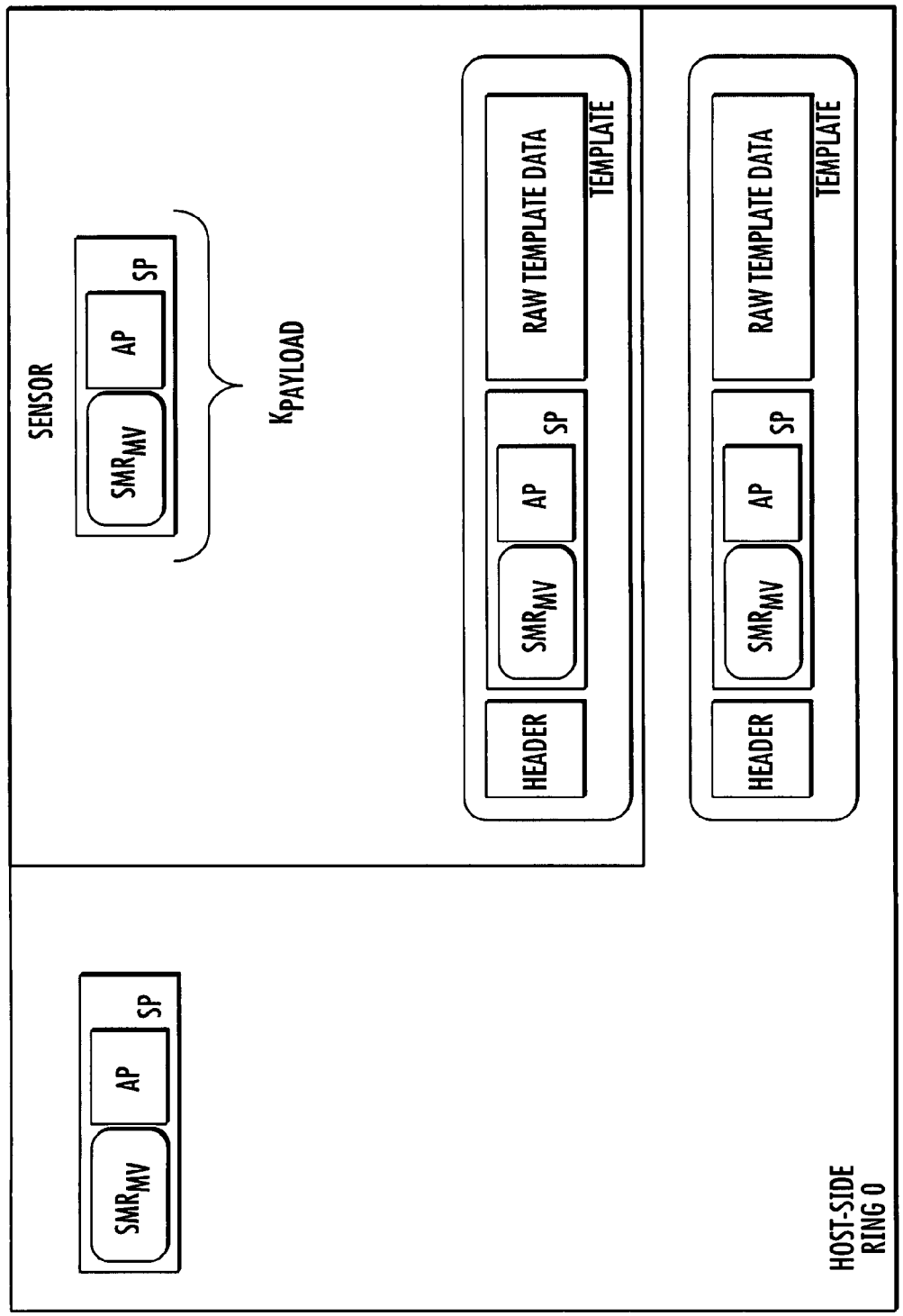
FIG. 10 is a schematic diagram illustrating the generation of an encrypted user template including the application payload and encrypted secure payload in accordance with various features of the present invention.

An embodiment of the enrollment process will be described below with additional reference to FIG. 10. The process will proceed and include application payload encapsulation. A high-level description of the steps is provided in the following list:

1. The application creates the application payload AP. This can be key material, certificates, or whatever other information is required by the overall security structure to grant user privileges.
   a. The contents of this payload are opaque to the software and are recommended to be encrypted by the application before this step.
   b. The application payload may be limited to 3-kbytes in size.
2. The application then calls the Windows Service finger-enrollment function passing the application payload as a parameter.
   a. Before all operations, a secure communication channel must be exist between the application and the service and between the service and the driver.
3. The service will then call the device driver's finger-enrollment function passing on the application payload.
4. The driver establishes a secure session with the sensor.
   a. The sensor also initializes the $SMR_{MV}$ register to prepare it for template measurements. (This happens whenever a secure session begins.)
5. The driver will perform the functions necessary to obtain a non-watermarked image from the sensor.
   a. User prompts and feedback should traverse the chain back up to the application for display.
6. The driver decrypts the image and uses it to build a partial template.
7. Repeat steps 5 and 6 until the template quality is acceptable for enrollment.
8. The driver will now create an evenly distributed random distortion pattern for use in creating the template data watermark.
   a. The distortion pattern is encoded into a 20-byte template watermark key.
9. The driver modifies template ridge-flow nodes to fit the distortion pattern. This creates a template watermark that will be checked during authentication operations.
   a. The template watermark validates the matcher during authentication, and ties the SP to this particular template in a way that prevents substitution attacks.
10. A SRA1-based measurement of the template data is then extended into $SMR_{MV}$ using the Extend SMR sensor command.
    a. Note: any template compression must occur before this measurement.
11. The driver performs a SHA-1 measurement of the application payload (AP), which will be used as an AP signature in the template.
    a. Note: the AP Signature is used to identify templates from the same user in other operations, such as credential updating and template backup. For this reason, it should be placed outside the encrypted portion of the template.
12. The driver creates an AP stream from the AP and template watermark key. An example format follows:
    a. Reserved space for $SMR_{MV}$—20-bytes
       Template Watermark Key—20-bytes
       AP length—Uint16 (2-bytes)
       AP
13. The driver begins sending the AP stream to the sensor in blocks of 992 bytes using the Encrypt AP Block command. On the last block, any unused bytes will be filled with zeros.
14. If this is the first block, the sensor will prefix a B0 block and the current contents of $SMR_{MV}$ to the block and encrypt it using the μHSM and its internal payload key. If this is not the first block then the sensor will prefix a nonce composed of B0 as modified by a portion of $SMR_{MV}$ and encrypt it using the μHSM.
    a. For each block sent, the sensor will return 1024 bytes of data encrypted into a secure payload (SP).
15. The driver concatenates the returned encrypted blocks into the full SP blob.
16. The driver then places the SP and the AP signature into the template and prepares the template for encryption by appending fill data to the end of the template so it ends on a multiple of the template block size (1008 bytes).
17. The driver sends the template to the sensor in blocks using the Create Encrypted Template Block command.
18. The sensor encrypts the template blocks using its internal template encryption key (TEK) and returns each block to the host.
19. The driver concatenates the encrypted template blocks, prefixes a header (including the AP Signature calculated above) and writes the final template to the data store (e.g. SPI flash)
    a. Note: the driver provides the Host Root Key (HRK) in order to authorize erase and write operations to the SPI flash part.
20. The driver terminates the secure session and returns control up the call stack.

An example of a Secure Fingerprint Authentication Process will now be described and is designed to make it extremely difficult to modify the matcher or templates and thereby obtain access to the security information in the payload. The security provided is multi-layered and takes advantage of the secure environment provided by the sensor.

The first layer of protection includes loading and decrypting the pre-match processor (PMP) at the last possible moment and running it as part of the driver process. This restricts the attack window to processes running in ring 0 and to the timeframe of the matching operation (during pre-boot, the PMP will be loaded and run by option-ROM code). As would be appreciated by the skilled artisan, ring 0 is the computer architecture level with the most privileges and interacts most directly with the physical hardware such as the CPU and memory.

The sensor provides the next layer of protection. As the only entity with the capability to decrypt the payload, the sensor can force the matcher to measure itself, the template and the machine during matching operations. The sensor can also measure the time between various communications events and cancel the operation if the host is stopped with a debugger. The sensor also checks the template watermark, the image watermark and performs the final match operation. The following list provides a high-level description of the steps that may be involved in authentication:

1. The application requests authentication from the service, which then instructs the driver to initiate an authentication operation.
2. The driver establishes a secure communication session with the sensor, which causes the sensor to initialize $SCR_{MV}$.
3. The driver runs the sensor to capture a watermarked image (prompts and user feedback are passed to the service for display or application callbacks).
4. Once a usable image is obtained, the driver performs a one-to-few unsecured match to find a template of interest.
   b. Note: the templates will be decrypted using the sensor's Get Decrypted Template Block command.
5. If any of the templates is determined to be a match, then a secure match is initiated by the driver.

6. At the beginning of the secure match, the driver will load and decrypt the PMP into memory and send the security payload to the sensor.
7. The sensor will decrypt the security payload to internal RAM and extract the template watermark key. It will also start running a communication watchdog timer that resets each time valid data is received from the host. Alternatively, the timer may run for the entire pre-match operation and timeout if the entire activity takes to long.
8. The driver will perform the secure pre-match operation which includes the following actions in addition to performing the match: the measurements of the machine, template data, and matcher code that were made during enrollment will be repeated (in the appropriate order) and sent to the sensor for extension into the $SCR_{MV}$ register. Intermediate matcher results at the block level will be streamed to the sensor for validation and final match calculations.
9. Two types of block scores must be calculated, one set is image centric and used to validate the image watermark, the other set is node centric and is used to validate the template watermark.
10. As the block scores arrive for each node, the sensor will perform two actions: the block scores will be accumulated in the correct fashion to derive the final match scores for the node and the watermark keys will be evaluated against the block scores. If the watermarks are not detected in the block scores, then one of the following is true: the template has been modified in real-time, the matcher has been modified in real-time, the image has been tampered with in real-time or the individual block scores have been modified in real-time. In any of these cases, the match will fail. This prevents several types of attacks.
11. If at any time during the secure the match, the communication watchdog timer expires, then it is assumed that the host has been halted by a debugger. In this circumstance the sensor will fail the match, invalidate the secure session and revert to non secure mode. This will force the secure match operation to be restarted from the beginning.
12. At the conclusion of the host match operations, the final data will be sent to the sensor, along with spot correlation information and final measurements.
13. The sensor will complete the evaluation of the intermediate results and determine if this results in a high enough score to result in a match.
14. At this point, the sensor also compares the contents of $SCR_{MV}$ to the measurements encrypted into the secure payload blob during enrollment.
15. If the measurement is identical AND the match score is high enough AND the watermarks are correct, then the sensor will return the decrypted application payload and the final match score to the host for further action. Otherwise, the payload is not returned.
16. The sensor also returns the image watermark key for use in possible template updating operations.
17. If the match was successful, the driver returns the AP to the calling application.
18. The driver terminates the secure session.
19. If the match score is high enough to allow for template updating and the PMP determines that node substitutions are advisable, then the PMP will use the image watermark key to remove the watermark from the image and then perform the template update by following the latter portions of the enrollment procedure.
   a. A new secure session will be opened if template update is required (this causes the sensor to re-initialize $SMR_{MV}$).
   b. A successful template update might result in a callback or message to the application that template update has occurred. At the least, it should be noted in debug traces.

In an example, the user may be encouraged to choose the initial policy settings, e.g by the initializing application immediately after initialization and user enrollment. This is a convenient approach since changing policy settings requires the owner pass-phrase, which the initializing application would already have from the owner. The following list provides an example implementation for setting policy information for the fingerprint security system.
1. The application requests policy choices from the owner. These choices may include: enable/disable PBA; enable/disable single swipe to desktop (SSD); enable/disable full volume encryption; enable/disable use of TPM for enhanced security.
   a. Note: the application may want to retrieve the current policy settings prior to prompting the user. The service should provide an API for this. (The sensor command: Get Security Flags can be used by the driver to retrieve this information.)
2. The application calls the service to perform a policy update passing the owner pass-phrase and the policy choices as parameters. The service passes this request and the parameters down to the driver to complete the operation.
3. The driver then creates the owner key from the owner pass-phrase using SHA-1 and then converts the new policy choices into the appropriate security flags.
4. A new secure session is established between the driver and the sensor, and then the Update Policy command is issued to the sensor with the owner key and security flags as parameters.
5. The secure session is then closed and the result of the operation is returned up the calling stack.

It is often necessary for users to change credentials for PCs and networks. If these credentials are stored directly into the Application Payload (AP), then the application will need to have a method of updating these credentials without requiring the user to re-enroll all their fingers and without requiring the owner pass-phrase. To keep the operation secure, the user is required to authenticate with the fingerprint system as part of this operation. Only one finger needs to be swiped as long as the same AP was used for all fingers for this user. If the external system uses different APs for each finger, then the process would have to be repeated for all fingers.

The following steps illustrate the process used to change the APs for a user. The process, as written, assumes that the same AP is used for all of a user's fingers.
1. The application creates a new AP and calls the service to request an AP change passing the new AP as a parameter.
2. The service passes this request on to the driver for action.
3. The driver performs a secure fingerprint authentication operation, which, if successful, leaves the driver with the following information:
   a. The raw template node information in the clear;
   b. The AP signature that was created and stored in the template during enrollment;
   c. The Template watermark key;
   d. The new AP (also the old AP but this is not needed).

4. The driver decrypts the Host Key Blob using HRK to obtain the PEK (Payload Encryption Key) which it then uses to load, decrypt, and decompress the $PMP_{CE}$ into memory.
5. At this point, the driver has all the materials needed to create a new secure template around the new AP.
6. The AP signature can now be used to identify other templates in the store that have the same AP and therefore also need to be updated. Templates with matching AP signatures are retrieved from the data store in preparation for update.
7. The PMP and Platform specific information (PSI) are measured for use in the $SMR_{MV}$ extensions that are required later. A new AP signature is also calculated.
8. For each template that requires update the following looped steps may be performed:
    a. The driver establishes a new secure session with the sensor (this causes $SMR_{MV}$ to be initialized)
    b. The driver then decrypts the template using the sensor (except for the first template which is already decrypted).
    c. The existing Secure Payload (SP) is discarded from the template and the PMP and PSI measurements are extended into the $SMR_{MV}$ register using the appropriate sensor Extend SMR command.
    d. The raw template node information is then measured and extended into $SMR_{MV}$.
    e. The new AP is sent to the sensor and converted into an SP; for details on this operation, reference is made to the enrollment process section.
    f. The driver then embeds the new SP into the template and sends the new template through the sensor for encryption using the same steps used in the enrollment process.
    g. Once the header (with the new AP Signature) has been prefixed to the encrypted template, the template can be stored.
    h. The secure session must now be terminated.
    i. The driver now returns to step a above until all templates for this user have been updated.

An example of user-level backups will now be described and may be performed by any enrolled user and result in backups of only that user's templates. This type of backup is also limited in that the templates can only be restored to the same machine (with the same sensor) where the backup was created. This type of backup only provides protection against an accidental deletion of one or more templates from the fingerprint system. Backup and restore operations at the user level are authorized by fingerprint verification. The following list operations provide an example implementation sequence.
1. The application requests a user-level backup from the service.
2. The service passes the request down to the driver.
3. The driver performs a fingerprint authentication to identify one of the user's templates.
4. The driver uses the released AP to compute the AP Signature and uses the value to identify other templates in the store that have the same AP.
5. The driver returns the appropriate templates to the service in a backup database.
6. The service returns the template backup database to the application for storage on backup media.

An example of user-level restores will be described and can be performed by any user, but may only be used to restore that user's templates, and only to the computer from which they were originally backed up. User-level restores require fingerprint authentication for authorization. The following list of steps is performed to restore the templates.
1. The application requests a user-level restore from the service passing the backup template blob as a parameter.
2. The service passes the request and the template backup database on to the driver for further action.
3. The driver performs a fingerprint authentication using the passed-in backup templates.
    a. Note: if the templates do not belong on this machine, then they will not decrypt properly. This prevents template substitution.
4. A successful match verifies that the owner of these templates is present at the machine.
5. The driver now places each template from the backup into the data store if the template is not already present. (A byte-by-byte comparison is made to prevent duplicate templates.)

An example of a system level backup will be described and this process allows the system owner to backup all templates in a fashion that allows them to be restored on another machine or on this machine after the sensor is replaced. To make this possible, a sensor command is provided that allows APs to be decrypted without a fingerprint match as long as the correct owner key is provided. This capability may be a security risk, but OEMs may desire a convenient method of migrating templates from one machine to another and from one sensor to another regardless of the security implications.

Essentially, this command creates portable template data by decrypting all of the templates, removing the APs from the Secure Payloads, and re-encrypting the AP and raw template data in a new blob. The relationship between templates and APs is maintained and the new blob is encrypted with a key provided the user. The following list provides additional details on the operation of this process.
1. The application should obtain the owner pass-phrase and a backup pass-phrase from the user, then call the service passing both pass-phrases as parameters.
2. The service passes the parameters on to the driver which uses the pass-phrases to create the owner key and a backup encryption key (BEK).
3. For each template in the data store, the driver will perform the following operations:
    a. The driver will use the sensor to decrypt the template;
    b. The driver will then extract the SP from the template and pass it to the sensor for decryption. This involves three sensor commands: Send SP Block, Check Owner Key and GetAPBlock;
    c. Next the driver will re-encrypt the appropriate clear template data and the clear AP into a backup database in such a way as to maintain the link between the two.
4. Once all templates have been processed, the entire database will be encrypted using the BEK generated above.
5. The resulting encrypted backup database is then passed back up the call stack to the application for storage on backup media.

An example of a System Level Restore (backup can be from any machine) will be described. This level of restore can only be performed with a system level backup database. The individual performing this restore must know the backup pass-phrase used when this backup was made and the current owner pass-phrase for the sensor on this computer. This type of restore is particularly useful for recovering from the following circumstances: After replacement of a failed sensor; After an accidental deletion of all system templates; When migrating user templates and credentials to a new PC; or After replacing any system component that is measured into the PSI. Functionality similar to this could be used to clone the templates and credentials to an external sensor allowing dual secure sensor operation.

In the case of failed sensor replacement, PSI component replacement, or migration to a new machine, fingerprint system initialization should be completed before the restore is performed. The following steps will accomplish a system level restore of templates and credentials.

1. Application loads backup blob from media.
2. Application requests Owner Pass-phrase and Backup Pass-phrase from user.
3. Application passes Owner Pass-phrase, Backup Pass-phrase and pointer to blob to Service.
4. Service transfers all Application supplied information to Driver.
5. Driver retrieves PMPce from data storage area.
6. Driver decrypts and decompresses PMP.
7. Driver measures PMP.
8. Driver measures PSI.
9. Driver generates BEK from Backup Pass-phrase.
10. FOR each template:
    a. Driver establishes secure session with sensor;
    b. Decrypt template and AP using BEK;
    c. Extend PMP measurement into SMR_MV;
    d. Extend PSI into SMR_MV;
    e. Measure Template Data;
    f. Extend Template measurement into SMR_MV;
    g. Send AP to Sensor and request SP;
    h. Driver embeds SP into Template;
    i. Driver sends Template to Sensor for encryption;
    j. Sensor returns encrypted template;
    k. Invalidate Secure Session;
    l. Store Template to data storage area.
11. Next Template.
12. Restore complete.

An example of a Secure Software Upgrade Process will be described. Since software is measured into the sensor to authorize some actions, updating software (after the AFSS is initialized and placed in enhanced security mode) requires that new saved measurements be stored and old saved measurements discarded.

Changes to the measurements in NVRAM can be authorized in two ways: provide a valid owner key or provide a special Authorization Message. Since software upgrades are often performed as automated operations, it is recommended using the Authorization Message when performing software installations and upgrades.

For an Authorization Message Based Software Upgrade, the following entities may involved in this upgrade method: SW development; Secure Key Store; signing computer; secure update application; Installer or client application; OS device driver; secure sensor; The measurement software running at OS, PSA and FDE time. Note that the authorization message may pass through the service under some circumstances, but that the service does not play any security role and is therefore not included in the following discussions.

Figure 11:
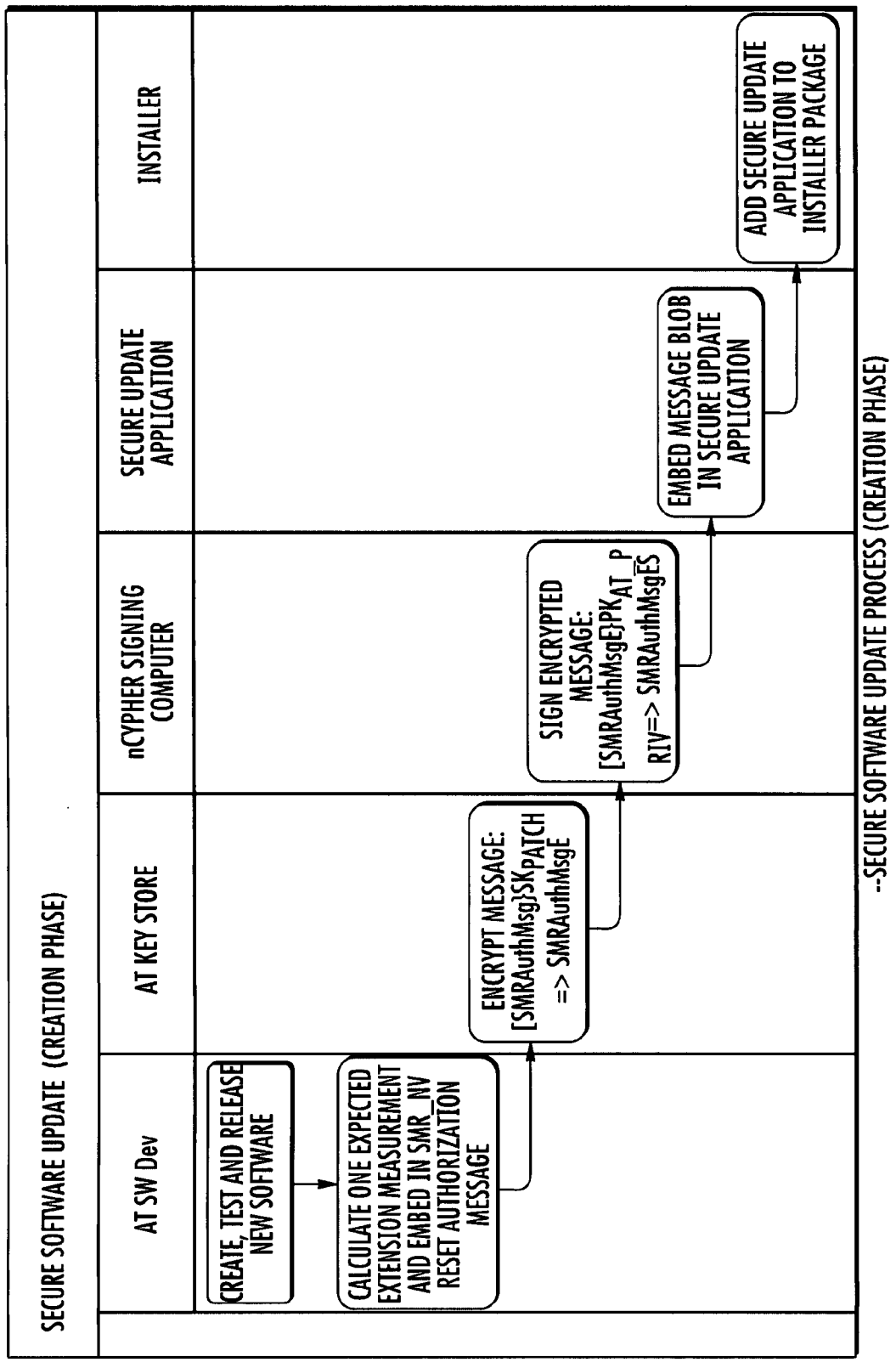
FIG. 11 is a flowchart illustrating an example of various steps of a creation phase of a secure software update process in accordance with various features of the present invention.
Figure 12:
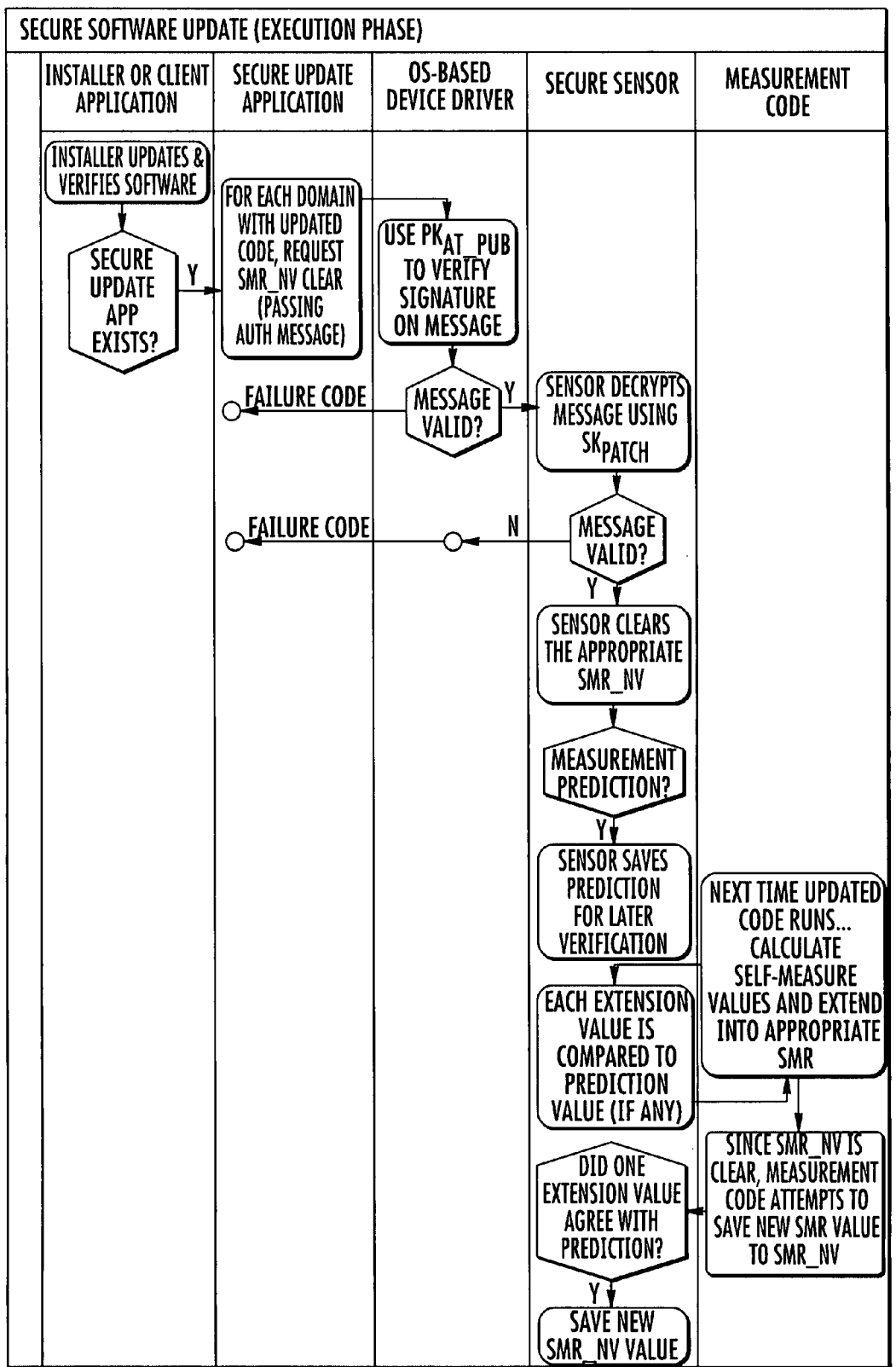
FIG. 12 is a flowchart illustrating an example of various steps of a execution phase of a secure software update process in accordance with various features of the present invention.
Figure 13:
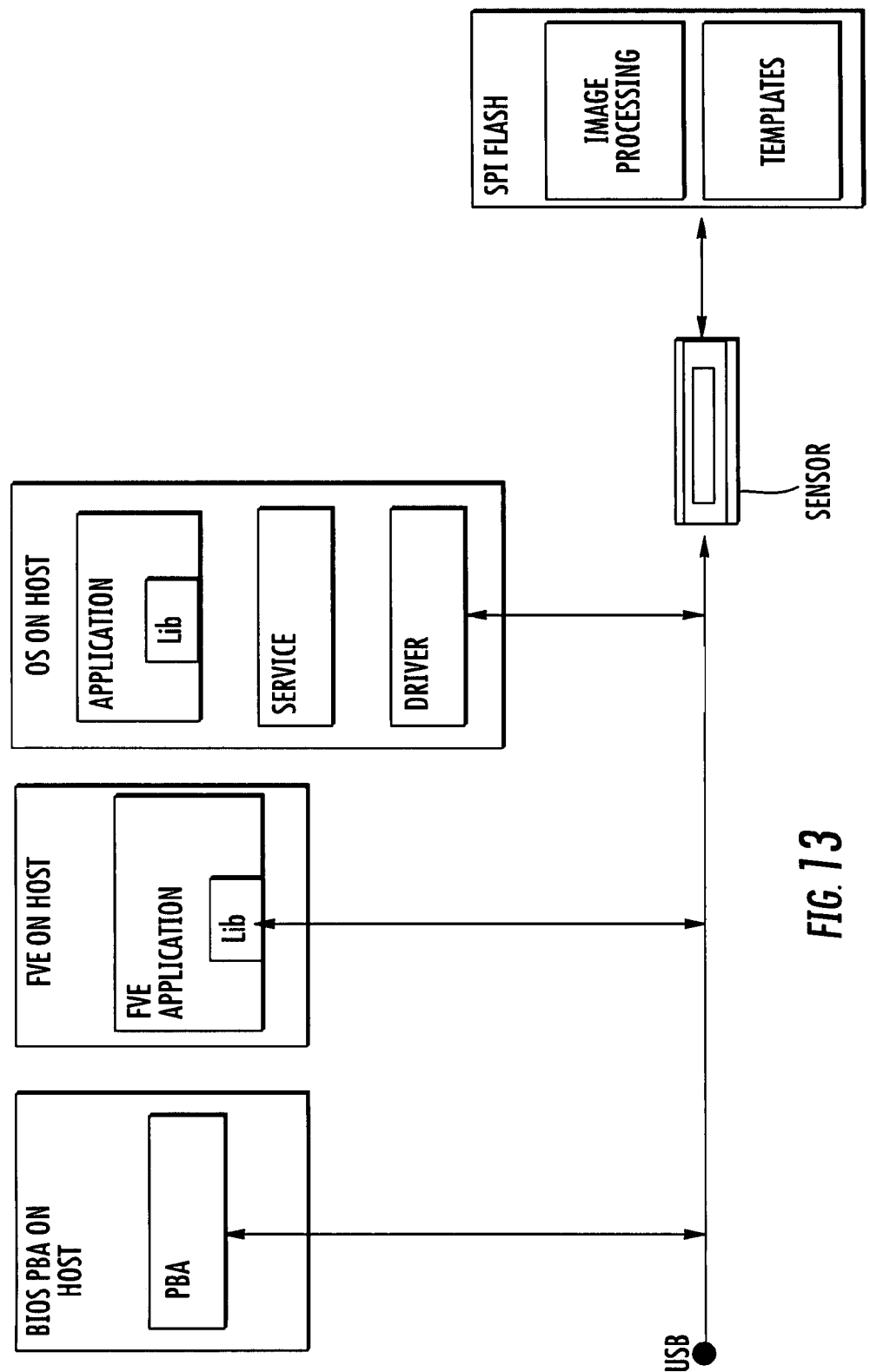
FIG. 13 is a high level schematic diagram of an example of a secure sensing apparatus including a sensor and host with BIOS PBA, FVE and OS authorization features in accordance with the present invention.

The swim-lane charts of FIGS. 11 and 12 show the actions of the various entities in the list above. Detailed descriptions of the actions shown in the charts follow. For creation phase:

1. Software Development (SW) creates, tests, and releases new software.
2. Once the software is completely ready, SW calculates one of the measurements that will eventually be extended into the sensor SMR for this software. For example, if the new software is the loadable driver portion of the PBA software, SW knows what portions of this software will be measured by the PBA loader. Therefore, SW can calculate what the eventual measurement will be on the target machine.
3. This SMR extension value is embedded within a SMR_NV clear authorization message. The message consists of a special sensor firmware patch that authorizes one of the three non-volatile saved SMR registers to be cleared.
4. The entire authorization message is then encrypted using the same shared key that is used to authenticate other patches. This key is embedded in the sensor and also stored on a limited access PC which can be used to encrypt the message.
5. Once the message has been encrypted, the hardware security module will be used to sign the message using the private portion of the Manufacturer's key pair. The private portion of this key never leaves the HSM. The OS device driver will have a copy of the public portion of this key which it can use to prove that the message was generated by the manufacturer. Note that in this case a digest of the message is actually signed, not the entire message.
6. The encrypted and signed message is then embedded in a Secure Update Application that will be called by an installer or other update application on the target machine.
7. The Secure Update Application is then added to an installer package or otherwise provided to the entity that will be upgrading the software.

For the Execution Phase:

1. The installer or application places updated software in the appropriate location and verifies the file copies (this is normal behavior for all installation entities).
2. If this is an installer-based update, the installer will already know that it needs to run the Secure Update Application. A stand-alone application such as a BIOS flash utility will not have that information, so it must check for a copy of the application in the same directory it runs from and if it finds the Secure Update Application, it should run it.
3. The Secure Update Application requests a secure software update from the OS driver, passing in the authorization message that was embedded in it at the manufacturer. The message authorizes the sensor to clear a specific nonvolatile saved SMR value.
4. The OS driver uses its copy of the manufacturer's public key to validate the message. If the validation fails, the driver will return an error to the Secure Update Application and refuse to pass the authorization message on to the sensor.
5. If the message is valid, the driver sends the message on to the sensor.
6. The sensor will decrypt the message using a secret key internal to the sensor. If this decryption fails, indicating a possible attack, the sensor will return a failure indication to the driver and refuse to clear any saved SMRs.
7. The sensor uses the information in the message to determine the saved SMR value to clear. The sensor clears that portion of NVRAM containing the information and resets the flag indicating that a value has been saved. This allows a new measurement to be made and saved when the updated software eventually runs.
8. In addition to information about which saved SMR value to clear, the message may also include a prediction of one of the measurements that will eventually be extended into the SMR when the new software runs. This prediction is stored in the NVRAM for future verification.

9. The next step in the process happens when the updated software loads and runs for the first time.
10. As a normal part of operation for all embedded measure code, measurements of critical portions of the software are made and then extended into the appropriate sensor measurement register (SMR).
11. As each measurement is extended into the SMR, the sensor logic will compare the extension value against the prediction (if a prediction exists). If one of the extension values matches the prediction, a volatile flag will be set in the sensor.
12. At the end of the measurement process, the measurement software will detect that no saved value exists and request the SMR save operation.
13. If a prediction value exists, and the flag indicating a prediction match is not set, then the SMR save will be denied.
14. The check of the prediction value ensures that a particular Software Update Application will only work with software it was keyed to at AuthenTec, and cannot be used to install rogue software.

The following describes an example of a sequence of events as the system boots. Pre-boot, Full Volume Encryption and OS load are all covered with additional reference to FIG. 13. In this section, all pre-boot operations are referred to as if they are performed by an option ROM and user interface binary combination. In some systems these operations may be performed by UEFI drivers. Option ROM establishes secure session with sensor. Option ROM self-measures into SMR_PBA (or the BIOS can perform the measurement for enhanced security). Option ROM reads status flags from Sensor: Check Init_Complete=True; Check PBA_Enabled=True. If flags inconsistent, require owner passphrase to continue with boot: Generate submitted Owner_Key from passphrase; Sensor determines Owner_Key matches submitted Owner_Key (Note: Anti-hammering may be implemented for all functions that require check owner key.). Exit PBA Option ROM.

Option ROM measures PSI data and extends into $SMR_{PBA}$. Option RON loads and measures PMPce and extends $SMR_{PBA}$. Option ROM loads and measures PBUIe (if it exists) and extends $SMR_{PBA}$. Option ROM Requests HRK from sensor: Sensor compares value in SMR_PBA to SMR_PBA_VAL in NVM; and If equal THEN HRK is sent to Option ROM. Option ROM loads & decrypts Host_Key_Blob using HRK extracting the PEK into memory. Wipe HRK memory location. Option ROM decrypts and decompresses PMPce into memory using PEK. IF PBUI exists THEN Option ROM loads, decrypts and decompresses PBUI into memory using PEK. Option ROM wipes PEK memory location. Option ROM Performs Secure Fingerprint Authentication.

If Authentication is successful THEN: IF FDE_ACTIVE OR SSD_ENABLED=TRUE, Sensor stores AP into Sensor RAM for delivery to FDE and/or OS device driver; IF FDE_ACTIVE=FALSE, Option ROM extends $SMR_{PBA}$ w/Random data (Cap); Invalidate Secure Session; Pre-boot Authentication Complete; Option ROM returns control to BIOS. Otherwise Retry (up to limit) if match is unsuccessful or proceed with boot or alternative authentication method (passphrase etc) per policy.

The full volume encryption or Full Disk Encryption (FDE) software requires credentials before it will decrypt the drive. These credentials can either be part of the credentials in the AP or can be generated from those credentials. The FDE software gets the AP from the sensor without performing a fingerprint authentication if it is available from PBA. If not, it must perform its own fingerprint authentication. Assuming the system has a full volume encryption component, the boot sequence continues. FDE runs and requests Library to provide AP, (Note: library (ATLib) statically linked within FDE application). ATLib requests status flags from Sensor. If Init_Complete=FALSE return failure code to FDE (Note: FDE may have to perform some other method of authentication (should only occur during software updates)). ATLib establishes secure session with Sensor. ATLib requests stored AP from Sensor. If AP does not exist THEN sensor returns error code to ATLib, this occurs when Passphrase is used or no Option ROM present.

IF AP does exist, sensor delivers AP to ATLIB, Only If (FDE_Active AND $SMR_{PBA}$ Valid), (Note: Sensor may actually return AP if (FDE_Active AND $SMR_{PBA}$ valid) OR (SSD_Enabled AND $SMR_{OS}$ Valid)—since sensor does not know which type (FDE or OS) of software is making the request; ELSE return error code to ATLib. IF ATLib has received AP from sensor (PBA saved the AP), THEN ATLIB provides AP to FDE and returns. ELSE If Option ROM did not run, ATLIB performs Secure Fingerprint Authentication (Note: works because $SMR_{PBA}$ has not been used and can be used by FDE instead). ELSE IF Option ROM is on system, but user entered Passphrase: ATLib returns error code to FDE (user must provide alternate authentication); ATLIB must extend random data into SMR_PBA to invalidate (Note: This is performed regardless of whether it has been previously capped in BIOS). Invalidate Secure Session. FDE Authentication Complete. ATLIB returns control to FDE.

In systems with Single Swipe to Desktop enabled (SSD) the driver may be able to retrieve an Application Payload (AP) from the sensor without performing a new secure fingerprint authentication. If the system has this capability disabled or if the PBA was bypassed by pass-phrase, then the system must get a swipe for login.

In either case, the boot sequence continues. Device Driver loads. Driver establishes secure session with Sensor. Driver self-measures and extends measurement into $SMR_{OS}$. Driver measures PSI data and extends into $SMR_{OS}$. Driver loads and measures PMPce and extends $SMR_{OS}$. Driver Requests Host Root Key (HRK) from sensor; Sensor compares value in $SMR_{OS}$ to SMR_OS_VAL in NVM; IF equal THEN HRK is sent to Driver. Driver decrypts Host Key Blob using HRK. Driver generates new HRK using Sensor uHSM. Driver commands Sensor to reset HRK sending old HRK and new HRK: Sensor should verify valid $SMR_{OS}$ prior to resetting HRK (Note: This limits change of HRK to once per boot, This occurs prior to anyone having logged in).

Driver requests stored AP from Sensor. Sensor delivers AP to DRIVER: Only IF (SSD_Enabled AND $SMR_{OS}$ Valid); ELSE (Passphrase used or alternate or SSD not enabled, etc); return error code. Driver extends random data into $SMR_{OS}$ to invalidate SMR. Driver re-encrypts Host Key Blob using new HRK and writes to data store (Note: If HRK_RESET fails, the driver must revert to old HRK and wipe key data, this will happen if a Plug and Play (PNP) event happens other than an OS Boot). Sensor Service load; Check sensor status. Is INIT_Complete flag set (answer here is yes)?. Application (GINA/VCP) requests AP from Service. Service requests AP from Driver. IF AP is not available THEN Driver performs Secure Fingerprint Authentication. Invalidate Secure Session. OS Authentication Complete. DRIVER returns control and AP to Service. Service returns control and AP to Application.

End of Normal Boot Sequence

An example of Roaming templates will be described. Roaming templates may only be accepted on systems where the policy authorizes them. The sensor will have a flag in NVRAM that identifies whether this policy is in effect. Roaming templates will be identifiable based on information in the unencrypted portion of the template header. The primary difference between roaming and non-roaming templates is that roaming templates within a workgroup will all be encrypted using the same key. This key will be stored in the sensor NVRAM using the HRK storage location. The HRK value will be set by broadcast from an application on a workgroup or domain server. When the flag roaming templates allowed flag in the sensor is set to true, the HRK will not be released to the driver based on valid SMR conditions, as it normally would be. Note that this architecture doesn't prevent a mixture of roaming and fixed-client templates on a particular machine.

To allow multiple secure sensors to operate on a single computer (and not require multiple enrollments) it may be necessary to clone the NVRAM contents of one sensor to another. This operation will require that the user provide the owner pass-phrase for the sensor to be copied. It will also require that the receiving sensor be in an un-initialized state. Sensors that have been initialized will not accept NVRAM clone data. The pseudo code below describes an example of the sequence of events to clone one secure sensor from another.

Check the new sensor to determine if it has been initialized. If Not: Allow user to clone sensor; Obtain Owner pass-phrase for existing sensor from user and convert to owner key; Command the sensor to export an NVRAM clone, passing in the owner key; The sensor will verify the owner key against the copy in NVRAM; If the key matches, Sensor derives a symmetric encryption key from the owner key, Sensor encrypts and transmits contents of NVRAM using derived key; Command new sensor to import NVRAM clone passing in the owner key and the clone blob; The sensor checks to see if it has been initialized; If not, Sensor derives decryption key from owner key, Sensor decrypts clone blob, Sensor checks passed in owner key against owner key in decrypted clone blob, If owner keys match, Decrypted clone blob is copied into NVRAM, Else FAIL command; Else FAIL command. Else no action required.

The following is a description of various security features that may be provided by the various embodiments of the present invention individually or in combination. Hardware Secured User Credentials (e.g. User-ID and Password): The user credentials are wrapped by the sensor and only unwrapped and released by the sensor upon a secure 4-step hardware based final match. On-Sensor 4-step Match: 4-step final-match on sensor required to release credentials from sensor including: 1—image processing data element processing being greater than a match threshold; 2—digitally watermarked data being validated; 3—the $SMR_{mv}$ being equal to the enrollment $SMR_{val}$; and 4—the watchdog timer not being expired. Hardware Encrypted Templates: Templates are encrypted with the sensor using keys that never leave the sensor. Encrypted Images and Data on USB Interface: All data, including image data, transferred between the sensor and software is encrypted using session encryption key generated on each secure session. Measured System Specific Encrypted Templates: Measured templates during authentication ensures prevention of template substation. Templates may only be encrypted and decrypted on system on which they were created, AES128 encryption may be used on all templates. Hardware Generated and Stored Keys: All keys are randomly generated within the sensor. Keys never leave sensor.

Digitally Watermarked Images & Templates: Ensures tamper-proof operation of host-side image processing by "watermarking" each image and template. Measured Components: Pre-boot, opt. FDE and OS security components are measured into sensor measurement registers (SMRs) to ensure trust of platform configuration prior to sensor operation. Trusted Software Components: Digital signature and challenge/response mechanisms ensure trust between all software components, including the application. Diffie Hellmann based secure sessions ensure trust between sensor and driver. Secure Data Transfer Between Software Components: All data transferred between software components, including to and from the application, is encrypted using SSL. TPM enhanced operation: TPM opt-in enhances software secure session between sensor and device driver.

May prevents global attacks. Secure user credentials: application defined payloads (AP) encrypted within secure payload (SP) that can only be decrypted inside sensor and only released from sensor following a valid fingerprint authentication. Ensures personal data privacy. Does not require TPM. Flexible application payloads: Network Login Credentials—Username, Pwd, Domain, etc. User Defined Encryption Keys; Correct Web Site Login Data—i.e. anti-phishing; Sub-APs can be incorporated—allows different system components (PBA, FVE, OS) to include their own credentials into a single overall AP.

Figure 14:
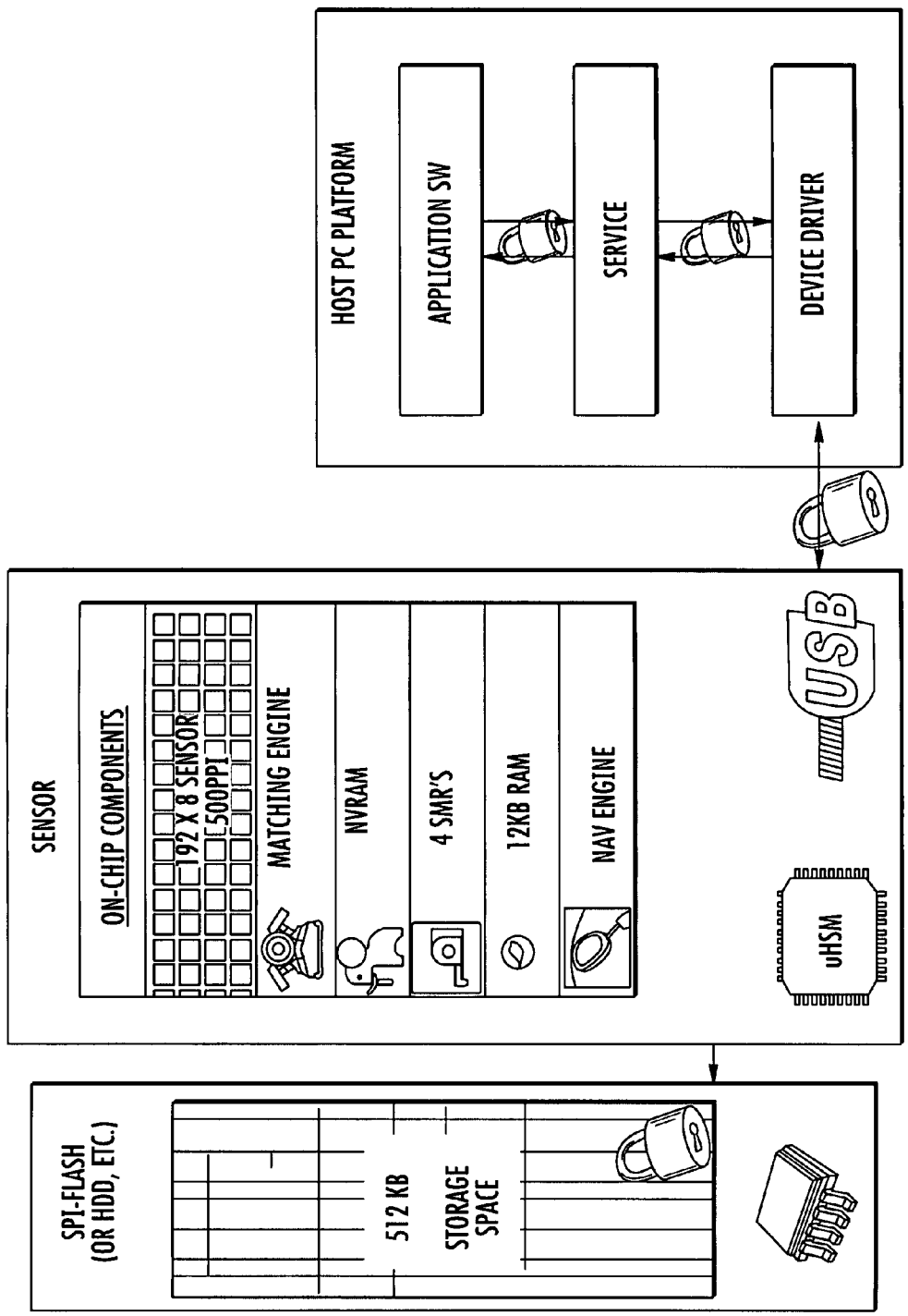
FIG. 14 is a schematic block diagram of another example of a secure sensing apparatus including components of the sensor, host and optional memory in accordance with various features of the present invention.
Figure 15:
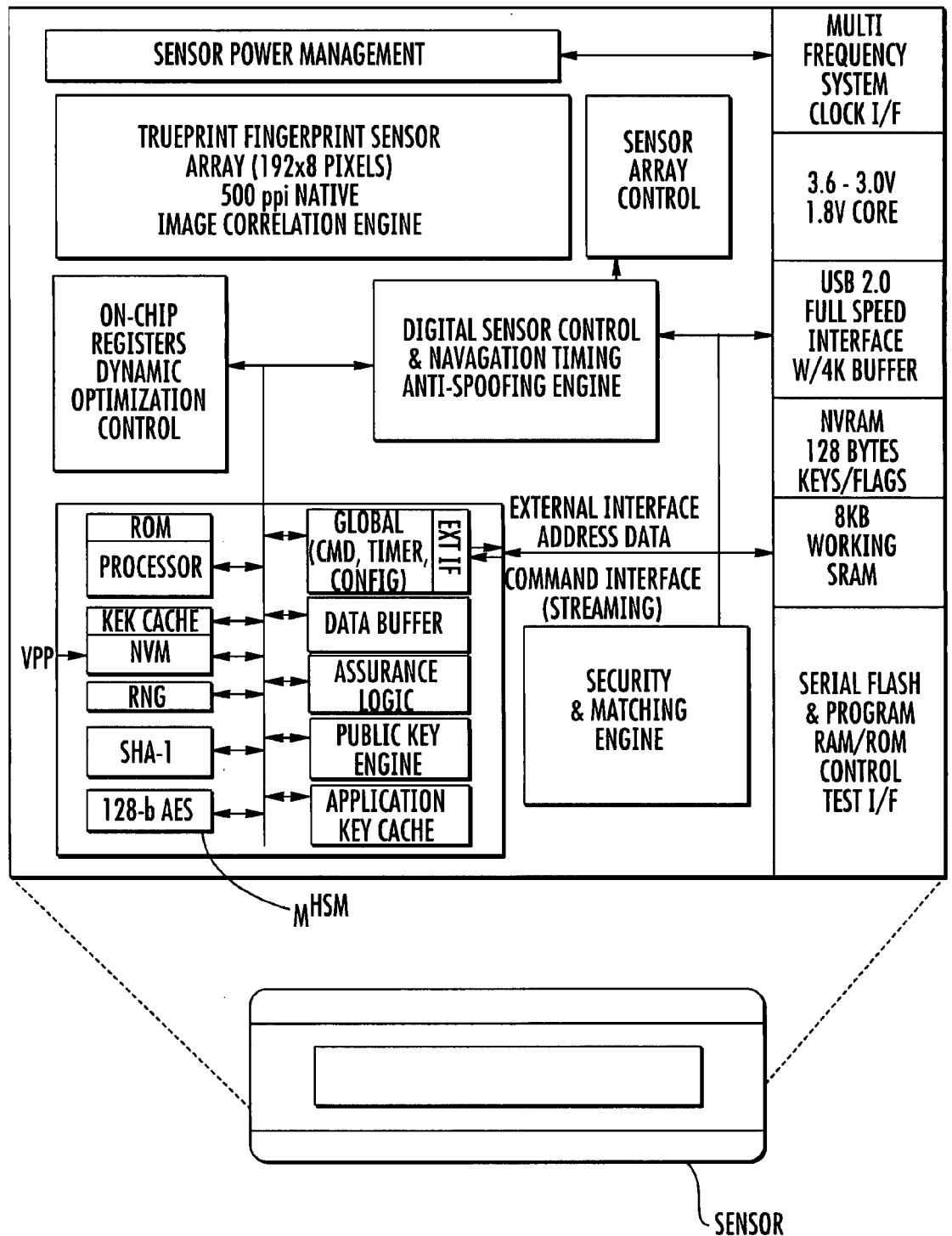
FIG. 15 is a schematic block diagram of an example of a sensor including various components therein in accordance with features of the present invention.
Figure 16:
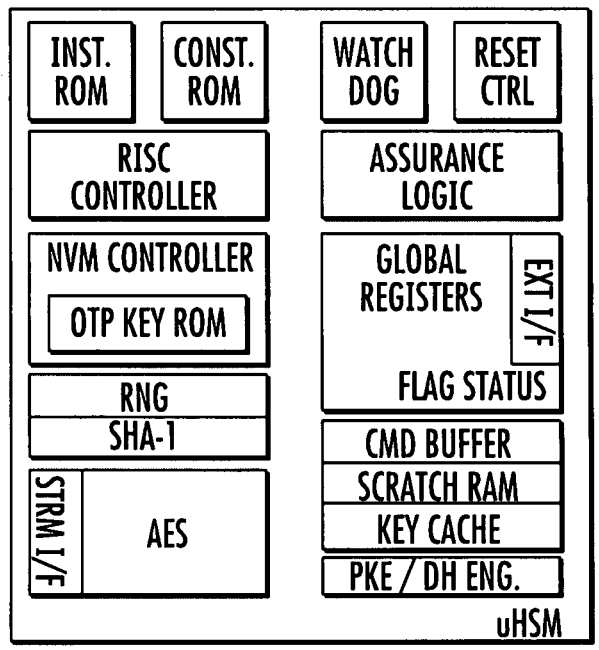
FIG. 16 is a schematic block diagram of an example of a hardware security module of a sensor including various components therein in accordance with features of the present invention.

Referring to FIGS. 14-16, further details of an example of the system including the host platform, sensor with hardware security module, and optional external memory, e.g. SPI-Flash or hardrive, will be described. The secure sensor may be a slide sensor, e.g. with a greater than 30 cm/sec slide speed. The sensor may include an On-Chip Hardware Security Module (uHSM) which will be described below with reference to FIG. 16. A NVRAM stores all encryption keys securely, Keys never leave the sensor. On-Chip Match Engine is included, and 128-bit AES Encryption/Decryption may be involved with all fingerprint images and templates, as well as the Secure Application Payload. Encrypted USB 2.0 Full Speed system I/F may be provided, and a private serial flash I/F with safe code and template storage. The sensor may include a 1.8V Core with 3.3V USB I/O. Furthermore, the sensor may include 45BGA Packaging: 13.8×5×1.68 mm, Advanced Durable Surface Coating, and Integrated Finger Drive. Electrostatic discharge capability (±15 KV) may be included, as well as advanced anti-spoofing for fake finger rejection.

The Hardware Security Module may define a Microprocessor-Controlled Security Engine. It may include a True Random Number Generator that generates all keys. A Keyed SHA-1 Hash Engine is used for SMR calculations, and a 128-bit AES Engine encrypts templates, etc. A Public Key Engine for DH allows secure USB Communications. A Non Volatile Memory is included and other Tamper Assurance Features as illustrated in FIG. 16.

Figure 17:
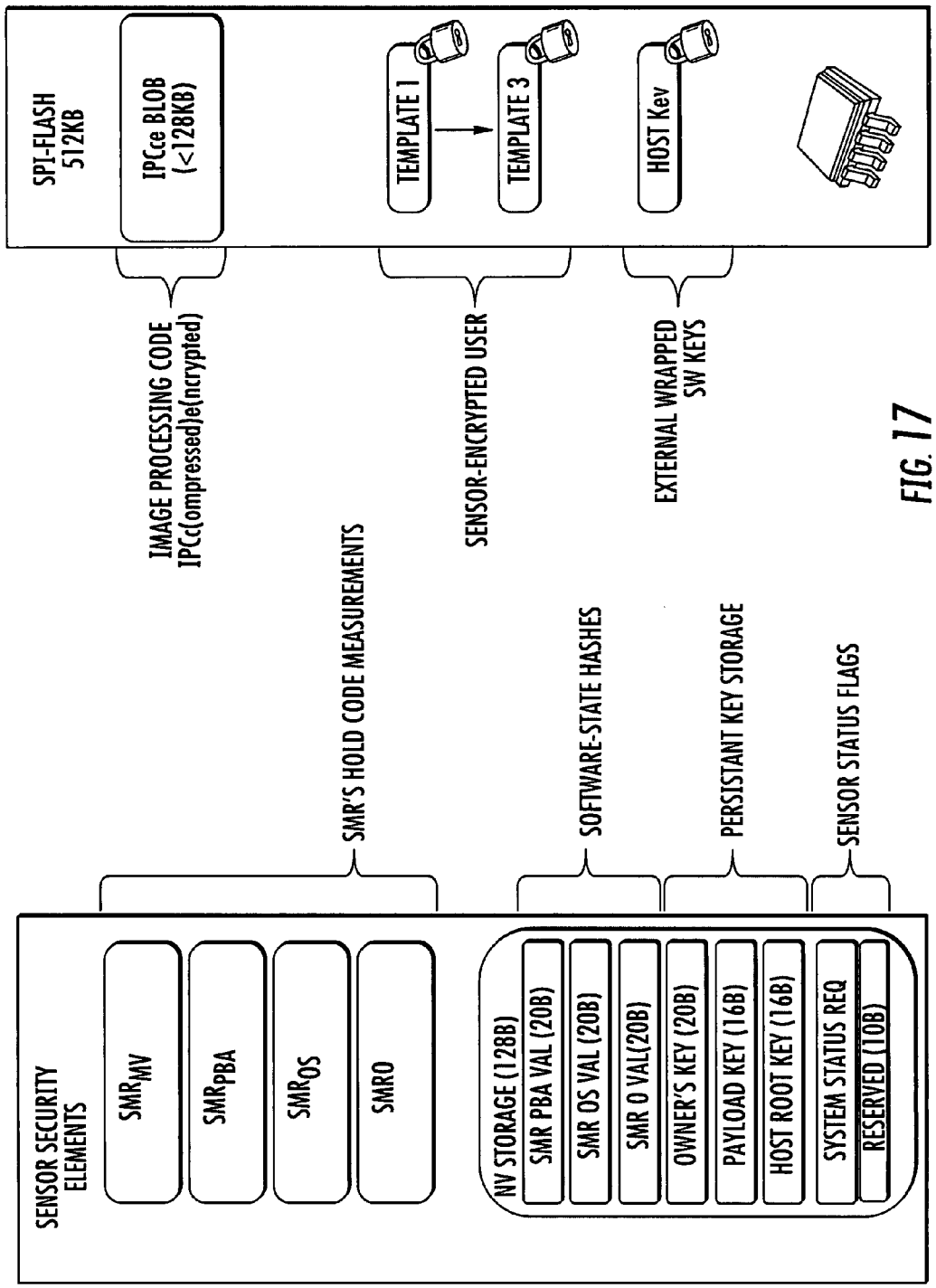
FIG. 17 is a schematic diagram illustrating the security elements of an example of a sensor and optional memory in accordance with features of the present invention.

Referring to FIG. 17, the hardware security elements of an example of the system including a sensor and optional external memory are illustrated. As discussed, the sensor or system measurement registers (SMRs) hold code measurements. The NVM of the sensor includes software state hashes, persistent key storage and sensor status flags. The optional external memory, e.g. 512 KB SPI-Flash, may include image processing code, sensor-encrypted user templates, and external wrapped SW keys.

Many modifications and other embodiments of the invention will come to the mind of one skilled in the art having the benefit of the teachings presented in the foregoing descriptions and the associated drawings. In addition, other features relating to the finger sensing apparatus, electronic device and methods are disclosed in copending patent applications filed concurrently herewith and assigned to the assignee of the present invention and are entitled FINGER SENSING APPARATUS USING TEMPLATE WATERMARKING AND ASSOCIATED METHODS, U.S. patent application Ser. No. 11/851,798 filed Sep 7, 2007; FINGER SENSING APPARATUS USING ENCRYPTED USER TEMPLATE AND ASSOCIATED METHODS, U.S. patent application Ser. No. 11/851,796 filed Sep. 7, 2007; FINGER SENSING APPARATUS USING HYBRID MATCHING AND ASSOCIATED METHODS, U.S. patent application Ser. No. 11/851, 826 filed Sep. 7, 2007; FINGER SENSING APPARATUS USING UNIQUE SESSION KEY AND ASSOCIATED METHODS, U.S. patent application Ser. No. 11/851,881 filed Sep. 7, 2007; FINGER SENSING APPARATUS WITH CREDENTIAL RELEASE AND ASSOCIATED METHODS, U.S. patent application Ser. No. 11/851,856 filed Sep. 7, 2007; and FINGER SENSING APPARATUS PERFORMING SECURE SOFTWARE UPDATE AND ASSOCIATED METHODS, U.S. patent application Ser. No. 11/851,887 filed Sep. 7, 2007, the entire disclosures of which are incorporated herein in their entirety by reference. Therefore, it is to be understood that the invention is not to be limited to the specific embodiments disclosed, and that modifications and embodiments are intended to be included within the scope of the appended claims.

That which is claimed is:

1. A finger sensing apparatus comprising:
an integrated circuit (IC) substrate;
an array of finger sensing elements on said IC substrate;
image watermark circuitry on said IC substrate and cooperating with said array of finger sensing elements for generating finger image data with an image watermark embedded therein; and
match circuitry on said IC substrate for performing finger matching based at least upon the image watermark.

2. The finger sensing apparatus according to claim 1, wherein said array of finger sensing elements comprises an array of finger sensing pixels; and wherein said image watermark circuitry distorts values from said array of finger sensing pixels to generate the finger image data with the image watermark embedded therein.

3. The finger sensing apparatus according to claim 2, wherein said watermark circuitry distorts position values from said array of finger sensing pixels.

4. The finger sensing apparatus according to claim 2, wherein said image watermark circuitry further comprises image watermark key generation circuitry for generating an image watermark key to generate the finger image data with the image watermark embedded therein.

5. The finger sensing apparatus according to claim 4, wherein said image watermark circuitry further comprises a key cache for storing the image watermark key therein.

6. The finger sensing apparatus according to claim 5, wherein said key cache does not release said image watermark key from said IC substrate.

7. The finger sensing apparatus according to claim 4, wherein said key generation circuitry further comprises a random number generator (RNG), and an associated hash engine cooperating therewith for generating the image watermark key.

8. The finger sensing apparatus according to claim 1, further comprising credential release circuitry on said IC substrate cooperating with said match circuitry for releasing at least one user credential based upon finger matching thereby enabling another device to perform at least one protected operation.

9. The finger sensing apparatus according to claim 1, wherein said image watermark circuitry generates the finger image data with an image watermark embedded therein during a matching.

10. The finger sensing apparatus according to claim 1, further comprising a host platform external from said IC substrate and performing at least one prematch function.

11. The finger sensing apparatus according to claim 10, wherein the at least one prematch function comprises generating at least one match score for use by said match circuitry.

12. The finger sensing apparatus according to claim 10, further comprising a common housing carrying said IC substrate and said host platform.

13. An electronic device comprising:
a housing;
an integrated circuit (IC) substrate carried by said housing;
an array of finger sensing elements on said IC substrate;
image watermark circuitry on said IC substrate and cooperating with said array of finger sensing elements for generating finger image data with an image watermark embedded therein; and
match circuitry on said IC substrate for performing finger matching based at least upon the image watermark.

14. The electronic device according to claim 13, wherein said array of finger sensing elements comprises an array of finger sensing pixels; and wherein said image watermark circuitry distorts values from said array of finger sensing pixels to generate the finger image data with the image watermark embedded therein.

15. The electronic device according to claim 13, wherein said image watermark circuitry further comprises image watermark key generation circuitry for generating an image watermark key to generate the finger image data with the image watermark embedded therein.

16. The electronic device according to claim 13, further comprising credential release circuitry on said IC substrate cooperating with said match circuitry for releasing at least one user credential based upon finger matching thereby enabling another device to perform at least one protected operation.

17. The electronic device according to claim 13, further comprising a host platform external from said IC substrate and carried by said housing for performing at least one prematch function.

18. A method for finger sensing comprising:
generating finger image data with an image watermark embedded therein using image watermark circuitry on an integrated circuit (IC) substrate cooperating with an array of finger sensing elements also on the IC substrate; and
performing finger matching based at least upon the image watermark using match circuitry on the IC substrate.

19. The method according to claim 18, wherein the array of finger sensing elements comprises an array of finger sensing pixels; and wherein the image watermark circuitry distorts values from the array of finger sensing pixels to generate the finger image data with the image watermark embedded therein.

20. The method according to claim 18, wherein the image watermark circuitry further comprises image watermark key generation circuitry for generating an image watermark key to generate the finger image data with the image watermark embedded therein.

21. The method according to claim 20, wherein the image watermark circuitry further comprises a key cache for storing the image watermark key therein; and wherein the key cache does not release the image watermark key from the IC substrate.

22. The method according to claim 18, further comprising releasing at least one user credential based upon finger matching thereby enabling another device to perform at least one protected operation using credential release circuitry on the IC substrate cooperating with the match circuitry.

23. The method according to claim 18, further comprising a host platform external from the IC substrate and performing at least one prematch function.

24. The method according to claim 23, wherein the at least one prematch function comprises generating at least one match score for use by the match circuitry.

25. The method according to claim 23, further comprising a common housing carrying the IC substrate and the host platform.

* * * * *